United States Patent [19]

Newdoll et al.

[11] 4,410,917
[45] Oct. 18, 1983

[54] METHOD OF AND APPARATUS FOR RECORDING INFORMATION FROM A MASTER MEDIUM ONTO A SLAVE MEDIUM EMPLOYING DIGITAL TECHNIQUES

[75] Inventors: Ronald M. Newdoll, Woodside; John E. Phillips, Cupertino, both of Calif.

[73] Assignee: Accurate Sound Corporation, Menlo Park, Calif.

[21] Appl. No.: 302,159

[22] Filed: Sep. 14, 1981

[51] Int. Cl.³ .............................................. G11B 5/86
[52] U.S. Cl. ...................................... 360/15; 360/32; 369/84
[58] Field of Search ...................... 360/15, 8, 10.1, 32; 358/310, 312, 335, 339; 369/59, 60, 84, 85

[56] References Cited

U.S. PATENT DOCUMENTS

| Re. 30,482 | 1/1981 | Whitlock | 360/32 |
|---|---|---|---|
| 3,479,648 | 11/1969 | Sleven et al. | 340/172.5 |
| 3,552,618 | 1/1971 | Molnar | 226/25 |
| 3,588,836 | 6/1971 | Frazier, Jr. | 340/174.1 |
| 3,608,798 | 9/1971 | Lawless | 226/25 |
| 3,633,307 | 1/1972 | Williams | 226/97 |
| 3,685,031 | 8/1972 | Cook | 340/174.1 |
| 3,786,201 | 1/1974 | Myers et al. | 179/100 |
| 3,805,284 | 4/1974 | Coon, Jr. et al. | 360/15 |
| 3,875,588 | 4/1975 | Bennett | 360/15 |
| 3,928,868 | 12/1975 | Grindley et al. | 360/15 |
| 4,141,039 | 2/1979 | Yamamoto | 360/32 X |
| 4,206,476 | 6/1980 | Hashimoto | 358/127 |
| 4,206,476 | 6/1980 | Hashimoto | 358/127 |

Primary Examiner—Robert L. Richardson
Attorney, Agent, or Firm—Jack M. Wiseman

[57] ABSTRACT

A method of and apparatus for recording information from a master medium onto a slave medium. Analog information on a master medium is reproduced and converted into digital information. The digital information is stored in a digital storage device. The digital information stored in the digital storage device is recovered from the digital storage device and converted from digital information into analog information. The analog information is applied to a recording device for recording the analog information onto a slave medium. Information is recorded in the digital storage device at the same rate as it is recorded on the master medium. Information is recovered from the digital storage device at a faster rate than it is recorded on the master medium and the information is recorded on a slave medium by the recording device at a faster rate than it is recorded on the master medium. Thus, less time is required for recording information on a slave medium than is required for recording information on the master medium to reduce the duplication time.

34 Claims, 18 Drawing Figures

METHOD OF AND APPARATUS FOR RECORDING INFORMATION FROM A MASTER MEDIUM ONTO A SLAVE MEDIUM EMPLOYING DIGITAL TECHNIQUES

BACKGROUND OF THE INVENTION

The present invention relates in general to apparatus for recording information from a master medium onto a slave medium, and more particularly to apparatus for recording information from a master medium onto a slave medium employing digital techniques.

Heretofore, duplicating equipment employed a continuous loop-bin tape storage device for the master tape reproducer. More specifically, the master tape was installed on a playback device with a temporary storage bin. The playback device advanced the master tape as an endless loop. Long rolls of magnetic tape were installed on each slave transport of the recording device. Each roll of magnetic tape installed on each slave transport of the recording device was of sufficient length to record a multiple of times the information stored on the endless loop magnetic tape. The slave tape moved at a speed which was s synchronous multiple of the original master. The master tape was advanced through the temporary storage bin a sufficient number of times to reproduce the information on a desired number of segments of each roll of slave tape, respectively. The recording of information on the slave tapes was performed at speeds which were the speed of recording information on the master tape or multiples of the speed of recording information on the master tape. Such a device had many draw-backs, such as tape breakage, head to tape contact wear, and tape wear. Additionally, the tape had abraded the playback head on the playback device. Such action had caused wearing on the playback head, which resulted in reducing the range of frequency responses for the system. The magnetic tapes had frequently snapped and were torn as they were transported into and out of the loop bin. As a consequence thereof, an operator had to stop the duplication process to repair the master tape, recue the slave tapes to the start of a tape point, and restart the duplication process.

Another apparatus for duplicating information from a master tape onto slave tapes employed a reel-to-reel master tape transport. Each slave tape respectively recorded the complete information from the master tape. The complete recording of the information contained on the master tape was followed by a rewinding of the master tape. Thus, each reproduced copy of the complete information from a master tape was followed by a rewinding of the master tape.

The loop-bin storage technique and the reel-to-reel technique were not suitable for the reduced time duplication of video recordings. Electrical problems and tape handling problems had prevented duplication of video tapes at any speed other than the master tape record speed.

Generally, tapes travelling at high speeds, such as 120 inches per second, reacted aerodynamically to the air pressure generated between the tape and the reproduce head. As a consequence thereof, the tape did not make intimate mechanical contact with the reproduce head. This action resulted in a reduction of the amplitude of the information signal from the master tape and a reduction in the frequency response of the duplication system.

Other problems realized from the loop-bin technique were tape flutter, oxide transfer from tape to reproduce head resulting in a loss of information from the master tape, and signal cross-talk as the tape travelled laterally across the reproduce head. This resulted in the coupling of adjacent channel information into the desired channel and the reduction of signal strength from the desired channel.

SUMMARY OF THE INVENTION

Method of recording information on a slave medium that is reproduced from a master medium in which analog information is reproduced from the master medium at the same speed at which it is recorded. The analog information is converted into digital information, which is stored in a digital storage device. The digital information is recovered from the digital storage device at a rate which is a multiple of the original recording speed and converted into analog information. The analog information is applied to a recording device for recording on the slave medium. The rate at which information is recovered from the storage device and the rate at which information is applied to the recording device is faster than the rate at which the information is recorded on the master medium.

Method of recording information on a slave medium that is reproduced from a master medium in which digital information is reproduced from the master medium at the same rate at which it is recorded. The digital information is stored in a digital storage device. The digital information is recovered from the digital storage device at a rate which is a multiple of the original recording speed and converted into analog information. The analog information is applied to a recording device for recording on the slave medium. The rate at which information is recovered from the storage device and the rate at which information is applied to the recording device is faster than the rate at which the information is recorded on the master medium.

In the event, it is desired to record digital information on the slave medium, the step of converting digital information into analog information is omitted.

By virtue of the present invention, recording of information onto a slave medium from a master medium has been achieved with improved signal-to-noise ratio, increased available bandwidth utilization, reduced signal distortion, reduced intermodulation distortion, and reduced phase shifts between reproduced frequencies.

It is an object of the present invention to provide apparatus for recording information onto a slave medium from a master medium in which tape breakage and tape wear has been reduced.

A feature of the present invention is the process of recording information from a master medium onto a slave medium in which the speed for recording information onto the slave medium is faster than the speed at which information was recorded on the master medium and the speed for recording information on the slave medium can be varied without being limited to the speed at which information was recorded on the master medium. The speed for recording information on the slave medium can be discrete multiples of the speed at which information was recorded on the master medium.

Another object of the present invention is to provide a method and apparatus for recording information on a slave medium from a master medium in which electrical problems and tape handling problems have been reduced notwithstanding that the speed for recording on the slave medium is other than and faster than the speed at which information was recorded on the master medium.

Another feature of the present invention is the apparatus for recording information from a master medium onto a slave medium in which the wear resulting from a master tape advancing over a playback head at high speeds has been eliminated, and in which the master tape abrading by the playback head has been reduced.

Another feature of the present invention is the apparatus for recording information from a master medium onto a slave medium in which the wear and tear on the playback head and the master tape, which lessens the frequency response has been reduced.

Another feature of the present invention is an apparatus for recording information from a master medium onto a slave medium, which enables the master tape to make intimate contact with the playback head during normal operating speeds for maintaining the amplitude of the information signal from the master tape and for providing an improved frequency response for the system.

An object of the present invention is to provide a method and apparatus for recording information from a master medium onto a slave medium in a significantly shorter time than had previously been considered normal time and still be suitable for video recording.

DESCRIPTION OF THE DRAWINGS

FIG. 15 is a data collection flow diagram of the program for the microprocessor employed in the apparatus shown in FIG. 1.

FIG. 17 is a data retrieving and recording flow diagram of the program for the microprocessor employed in the apparatus shown in FIG. 1.

DESCRIPTION OF THE PREFERRED EMBODIMENTS

Figure 1:
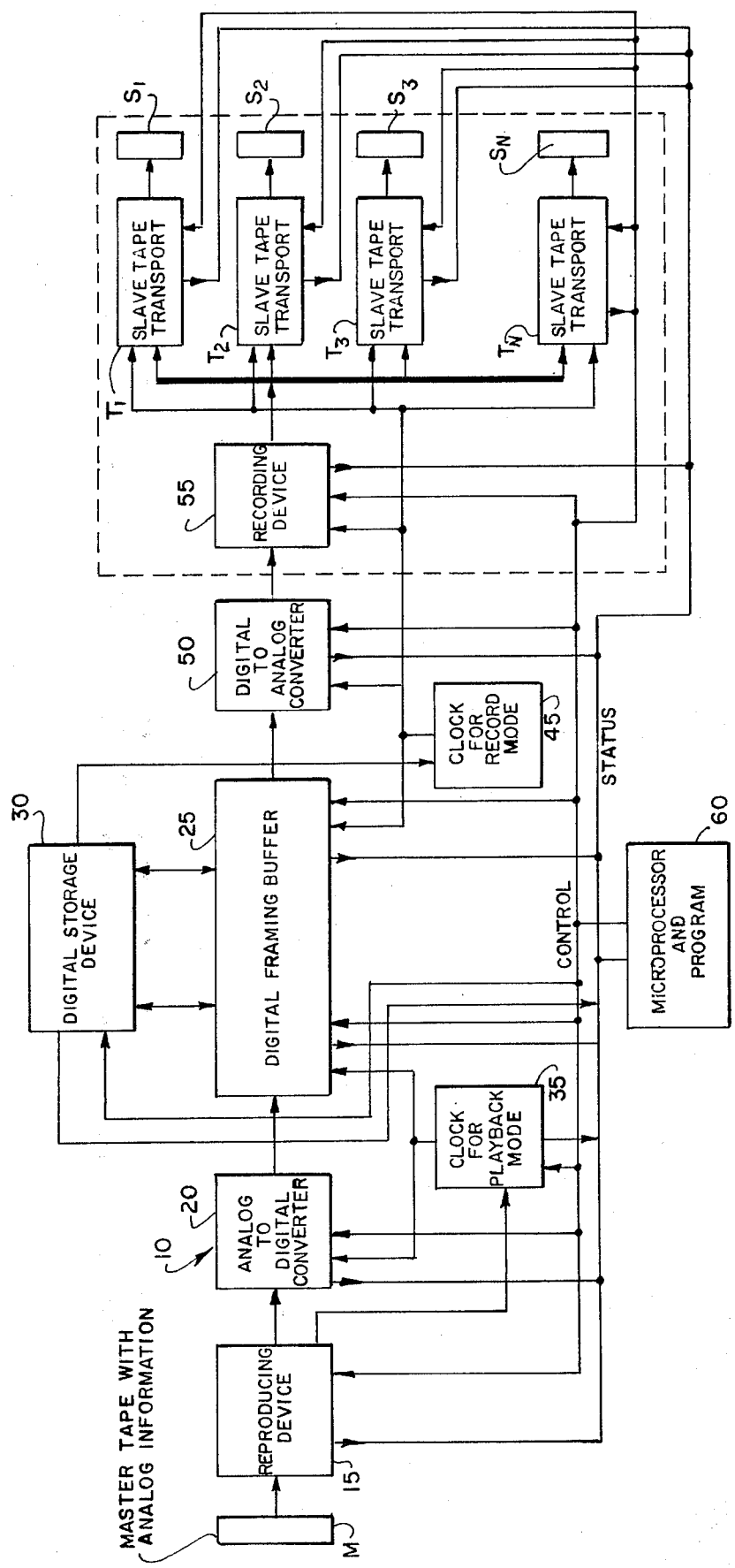
FIG. 1 is a block diagram of the apparatus embodying the present invention for recording analog information reproduced from a master mediun onto a slave medium employing digital techniques.

Illustrated in FIG. 1 is the apparatus 10 embodying the present invention for recording on slave media S1-SN Audio analog information reproduced from a master medium M with analog information recorded thereon. While the media, in the exemplary embodiment, are conventional magnetic tapes, it is apparent that the media may be in the form of conventional magnetic discs and the like. The master tape M may be single channel monaural, or dual channel stereophonic. For each channel over one, the operating components hereof may be repeated.

Reproduce Mode

The apparatus 10 of the present invention comprises a well-known reproducing device 15, such as reproduce tape transport manufactured by Accurate Sound Corporation of Redwood City, Calif. as Model AS 100. The master tape M having analog information recorded thereon is mounted on the reproducing device 15. The speed at which the master tape M rotates is the same as the speed for recording originally the analog information on the master tape M.

Connected to the output of the reproducing device 15 is a conventional and well-known analog to digital converter circuit 20, which converts the analog information recovered from the master tape M by the reproducing device 15 into digital information. Such an analog to digital converter circuit may be of the type manufactured by Analogic Corporation of Wakefield, Mass. as Model SHAD-2. In the exemplary embodiment, the conversion rate should be 2.5 times the highest frequency from the master tape M.

A digital buffer framing circuit 25 is connected to the output of the analog to digital converter 20. The digital framing buffer circuit 25 blocks the incoming data stream into standard size frames and adds header address information to each block. In addition thereto, the digital framing buffer circuit 25 adds coding to each frame of data for data error detection and error correcting.

Also, the digital framing buffer 25 provides temporary storage, formatting and reclocking for real time recording of a single channel of a digitized audio signal onto hard disc storage media of a digital storage device 30. The recording onto the hard disc storage media of the digital storage device 30 may contain variable lengths of real time data, which is encoded by using a differential pulse code modulation and which is blocked in a frame format to be recorded on the hard disc storage media of the digital storage device 30.

Figure 3:
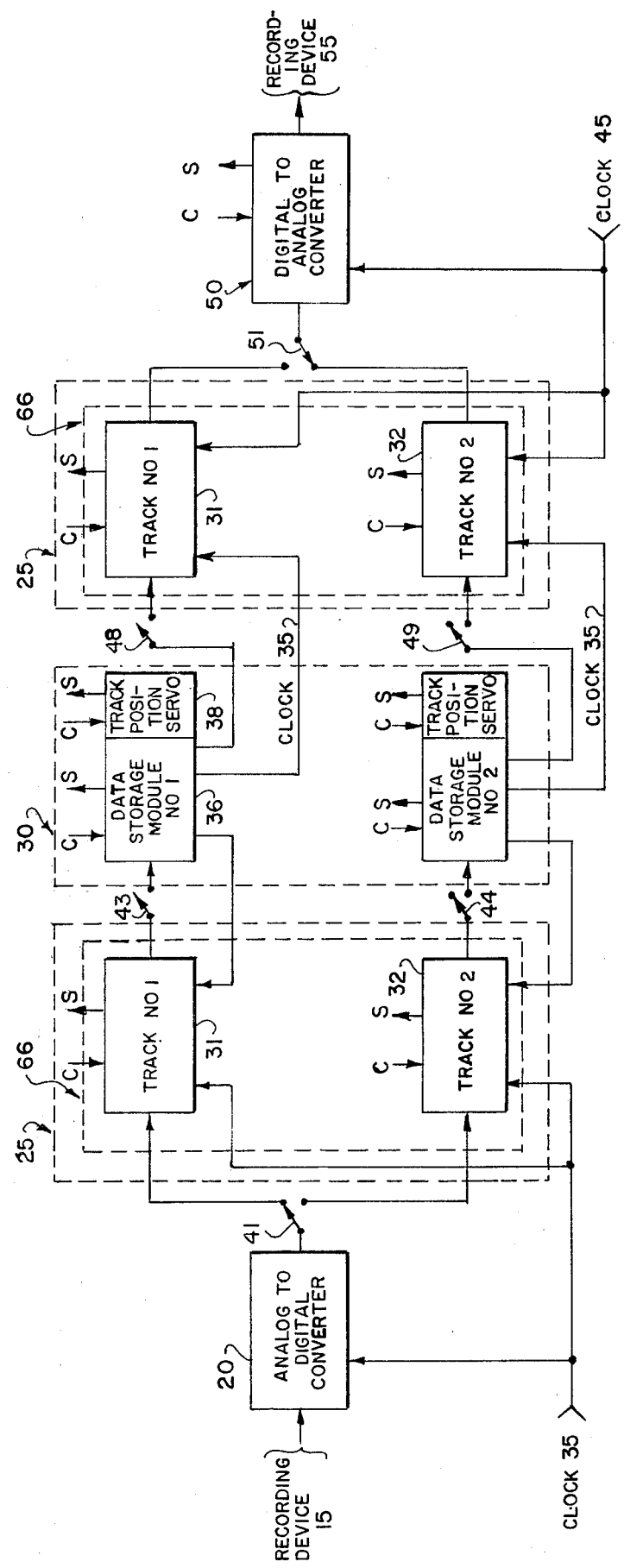
FIG. 3 is a diagrammatic illustration of the sequential operation of the apparatus of the present invention in the playback mode and in the record mode.

The digital framing buffer circuit 25, in the preferred embodiment, includes a plurality of tracks 31 and 32 (FIG. 3). The tracks 31 and 32 are part of a dual track buffer 66. While reference herein is made to tracks 31 and 32, the tracks 31 and 32 may be viewed as first-in-first-out registers. Data is recorded alternately onto the tracks 31 and 32 to be blocked and the blocked digital data is reproduced alternately from the tracks 31 and 32 in complete blocks for transfer into the digital storage device 30. While data is recorded onto one track, data is reproduced for transfer from the other track into the digital storage device 30. The timing of the loading and unloading sequences is under the control of a clock generator 35 (FIG. 1).

The digital storage device 30, in the preferred embodiment, comprises a pair of rotating disc storage modules 36 and 37 (FIG. 3). Each module contains at least one recording surface. Each recording surface contains annular tracks. Each module also contains a servo positioner, such as servo positioners 38 and 39, for tracking information. In this manner, a particular track can be located or relocated at any time. Digital information is stored on the disc storage tracks of the data storage modules under the control of the associated closed loop servo positioning device, such as the servo positioners 38 and 39. The foregoing, rotating disc storage modules 36 and 37 (FIG. 3), closed loop servo positioning devices 38 and 39, and drive assemblies are well-known in the art and are manufactured by Ampex Corporation of Redwood City, Calif., as Model No. DM-940.

As the master tape M advances through the reproducing device 15 at a speed substantially equal to the speed at which analog information was recorded on the master tape M, the reproduced analog information is applied continuously to the analog to digital converter 20. In turn, the analog to digital converter 20 applies to the digital framing buffer 25 a sequence of 16 bit samples of digital data in two's complement form at a rate of 50,000 samples per second.

Digital samples with address and error correction code are recorded onto the track 31 of the digital framing buffer 25 through a logic switch 43 in clock pulse synchronism with the analog to digital converter 20 through the operation of the clock generator 35. Up to this point, the clock pulse synchronism was in step with the reproducing device 15 through the operation of the clock generator 35. The remaining operations of the digital framing buffer 25 are clocked from a signal derived from the digital storage device 30.

After the first track 31 is loaded with data, address and error correction code, the information stored thereon is rapidly reproduced and discharged into the data storage module 36 of the data storage device 30 through a closed logic switch 43. The data storage module 36 produces a track start signal when the disc surface of the data storage module 36 has rotated to a standard mechanical track index position. Detection of this track index signal by a microprocessor 60 and the completely loaded track 31 initiates the discharge of the information stored reproduced from the track 31 into the data storage module 36 by the closing of the logic switch 43. Simultaneously, the switch 41 is opened to interrupt the path for recording on the track 31 from the analog to digital converter 20 and to close the path from the analog to digital converter 20 for recording on the track 32 of the digital framing buffer 25. While reference herein is made to a microprocessor, it is apparent that computers of many different types can be employed equally as well.

The clock pulses and storing capacity of the tracks 31 and 32 are selected to fill one data track of a data storage module during each complete revolution of a data storage module. With the logic switch 41 completing the path from the analog to digital converter 20 for recording on the track 32, the track 32 is storing digital information and the track 31 had reproduced the stored information for discharging the stored information in preparation for the succeeding recording step.

After the track 32 is loaded with digital information, the microprocessor 60 senses the standard mechanical track index position of the data storage module 37 of the digital storing device 30 and senses that the track 32 is completely loaded. Thereupon, the microprocessor 60 operates the logic switch 41 to reset the logic switch 41 to its initial state. The logic switch 43 is now opened by the microprocessor 60 and a logic switch 44 is closed by the microprocessor 60. The information stored on the track 32 is now rapidly reproduced for discharge onto the data storage module 37 of the digital storage device 30. Digital information is now being stored on the track 31, while the track 32 rapidly reproduces the digital information stored thereon in preparation for the next step.

The digital information stored on the track 32 and reproduced for discharge into the data storage module 37 includes digital samples, address and error correction code. The recording of the digital samples, address and error correction code onto the track 37 is in clock synchronism with the analog to digital converter 20 through the operation of the clock generator 35. Initially, the clock pulse synchronism was in step with the reproducing device 15 through the operation of the clock generator 35. The remaining operations of the digital framing buffer 25 are clocked from a signal derived from the digital storage device 30.

Each data storage module has associated therewith a servo track positioner to position the data track of its associated data storage module on the load position while its associated track of the dual track buffer 66 is reproducing digital information for discharging digital information and to position the data track of its associated data storage module to the succeeding track while its associated track of the dual track buffer 66 is receiving digital information from the analog to digital converter 20 to be recorded thereon. Thus, the servo track positioner 38 positions the data storage module 36 on one track while the track 31 reproduces and discharges digital information for storing in the data storage module 36 and positions the data storage module 37 on an alternate track while receiving and recording digital information from the analog to digital converter from the track 32. Similarly, the servo track positioner 39 positions the data storage module 37 on one track while the track 32 reproduces and discharges digital information for storing in the digital data storage module 37 and positions the data storage module 36 on an alternate track while receiving and recording digital information from the analog to digital converter 20 from the track 31.

After one track of the dual track buffer 66 is loaded, the logic switch 41 is activated to feed digital information from the analog to digital converter 20 to the other track of the dual track buffer 66. Thus, the tracks 31 and 32 are recording alternately. While one track of the buffer 66 reproduces and discharges rapidly digital information to its associated data storage module, the other track of the buffer 66 is receiving and recording at a slow rate digital information from the analog to digital converter 20. The data storage modules 36 and 37 are also loaded alternately. The logic switch 41 alternates its output operations at a slow speed between the tracks 31 and 32 to provide a smooth transition from the analog master tape M to blocked digital data.

The tracks of the dual track buffer 66 reproduce digital information alternately, discharge alternately and load alternately the data storage modules 36 and 37 with digital information. When the master tape M had transferred its analog information at real time speed and digital information converted therefrom at real time speed is stored in the digital storage device 30, one-half of the digital information is stored in the data storage module 36 and one-half of the digital information is stored in the data storage module 37. It is to be noted that as digital information is removed or reproduced from the tracks 31 and 32, respectively, the digital information is erased therefrom.

In a modification of the digital storage device 30, a solid state memory storage device of the serial first in and first out may be employed in lieu of the rotatable magnetic discs. Such a solid state memory device is manufactured by Intel Corporation of Santa Clara, Calif. as Model No. 4164 RAM. The storage device is filled alternately by the tracks 31 and 32 of the digital framing buffer 25.

Record Mode

Connected to the output of the digital storage device 30 is the digital framing buffer circuit 25. Data is read from one module of the digital storage device 30 by the digital framing buffer circuit 25 and then read from the other module of the digital storage device 30 by the digital framing buffer circuit 25. The alternate reading by the digital framing buffer circuit 25 of the disc storage modules 36 and 37 of the digital storage device 30 occurs after each complete revolution of the disc storage modules of the digital storage device 30 without interruption. As a result thereof, data is recorded by the tracks 31 and 32 of the dual track buffer 66 of the digital framing buffer circuit 25 in essentially a smooth digital signal stream. The rate at which data is read by the digital framing buffer circuit 25 is under the control of a clock generator 45. The clock rate of the clock generator 45 is adjusted to follow the output transfer rate of the disc drive of the digital storage device 30. The transfer rate will vary with the type of drive used for the disc storage, the data packing density and the speed of rotation of the disc drive. The input to the digital framing buffer circuit 25 from the disc storage modules 36 and 37 are alternating streams of encoded digital information. The output of the digital framing buffer circuit 25 is a stream of reconstructed data in the form suitable for the input of a digital to analog converter 50.

The digital framing buffer 25 is clocked at a rate determined by the track reference mark on the data storage modules 36 and 37 of the data storage device 30. The tracks 31 and 32 of the digital framing buffer 25 are continuously loaded on an alternate basis at the data storage device 30 burst rate. The sequence starts with the servo positioners 38 and 39 on the data storage modules 36 and 37, respectively, positioning the reproduce head to the first loaded module.

Under continuous control of the microprocessor 60, the data storage module 36 feeds digital information onto the track 31 of the digital framing buffer 40 until it is loaded with digital information. When the track 31 is loaded, the microprocessor 60 opens a logic switch 48 and closes a logic switch 49. In so doing, the data storage module 36 feeds digital information to the track 32 of the digital framing buffer 25 until it is fully loaded. Thus, the tracks 31 and 32 are alternately loaded from alternately unloading data storage modules 36 and 37 respectively.

When the track 31 is loaded, logic checks for data errors are made by the digital framing buffer 25. The digital framing buffer 25 makes corrections on the track 31 to correct the errors in the data and initiates the read out of data words in 16 bit parallel form to be applied to the digital to analog converter 50. The digital to analog converter 50 advances to the slave tape transports T1–TN an analog signal from the 16 bit data words. The slave tape transports T1–TN are operating simultaneously and are fed the analog signals simultaneously. The slave transports T1–TN are moving slave tapes S1–SN, respectively, across their record heads at an appropriate speed to reproduce the analog signals from the master tape M. The slave tapes S1–SN will record simultaneously and individually the data reproduced from the master tape M.

The track 31 is unloaded and ready for reloading by its associate data storage module 36 at the time the track 32 is loaded and switched to the digital to analog converter 50. A logic switch 51 is operated by the microprocessor 60 to alternately connect the track 31 and the track 32 to the digital to analog converter 50. While one of the tracks of the buffer 66 is unloading to the digital to analog converter 50, the microprocessor 60 is commanding the associated servo positioner to move the playback head to the succeeding module and prepare for the succeeding transfer to the other register of the buffer 66.

The microprocessor 60 provides synchronization of the data storage modules 36 and 37 and the associated tracks 31 and 32 of the digital framing buffer 25 cycling with precision the track load and unload steps. The data storage modules 36 and 37 are synchronized by clock pulses so that their track reference markers arrive at substantially the same time. In this manner, a continuous stream of data words is advanced to the digital to analog converter 50 from the tracks 31 and 32. Each track of the buffer 66 has one-half of the total recording on the master tape M in stepped segments. The increased speed in reproduce time is a direct function of data storage module load to unload speed ratio and the number of data storage modules employed.

A modification of the digital framing buffer circuit 25 is the employment of framing buffers to read data from the solid state memory device at a rate controlled by the clock frequency of the clock generator 45. The clock generator 45 applies a pulse frequency to the digital framing buffer 25 at a rate sufficient to maintain the framing buffers full for smooth data output to slave tape transports T1–TN of the recording device 55. The clock rate from the clock generator 45 is a direct function of the desired multiplier speed available at the slave tape transports T1–TN, of the recording device 55.

There are two modes of operation. One mode is a playback mode initiated at reproducing device 15 and the other mode is a record mode which includes the record device 55. Each mode is independent of the other. Each mode is selected along with the start and end commands through the microprocessor 60.

It is to be observed that the digital frame buffer 25 functions in the playback mode as an independent operation and functions in the record mode as an independent operation under the control of the microprocessor 60. The tracks 31 and 32 are used during the playback mode and during the record mode. The sequencing of the tracks 31 and 32 for alternate operation during the playback mode and alternate operation during the record mode is under the control of the microprocessor 60.

It is to be noted that digital information is read out of the digital storage device 30 as frequently as may be required for the number of duplications to be produced on all the slave tapes during a recording session. Thus, the head of the reproducing device 15 recovers information from the master tape M only on one occasion and then the repeat reproduction of the information is accomplished by the digital storage device 30. This reduces signal-to-noise degradation up to the final signal-to-noise ratio present at the output of the digital to analog converter 50 and the head drive amplifier in the recording device 55 at the tape transports T1–TN.

Each track of the master tape M passes through a chain of similar electronic components. Thus, cross talk from adjacent channels is minimized. All independent channels are clocked under the control of the system operator. Therefore, phase shifts between tracks on the master tape or in the stereophonic mode are minimized for the recording of slave tapes S1–SN.

The digital-to-analog converter 50 is manufactured by Analogic Corporation of Wakefield, Mass. Model No. 1926A and operates at rates which are multiples of the analog-to-digital converter 30.

The analog recording device 55 is of the type manufactured by Accurate Sound Corporation of Redwook City, Calif., Model No. AS-100. The analog recording device 55 is of the type that has an extended audio bandwith and controls the speed at which the tape travels by either internal or external clock pulses.

Timing pulses from the reproducing device 15 are transmitted as synchronizing pulses to the clock pulse generator 25 over a conductor 56. In turn, the clock pulse generator 25 under the control of the synchronizing pulses from the reproducing device 15 applies clock pulses to the analog-to-digital converter circuit 50, the digital framing buffer circuit 25 and the input side of the digital storage device 30. In so doing, all data transferred from the recording device 15, the analog-to-digital circuit 20, and the digital framing buffer 25 are in synchronism with or controlled by the timing pulses from the reproducing device 15. Hence, the frequency shifts of audio signals are minimized from the time of reproducing analog information from the master tape M to the storing of digital information in the digital storage device 30.

The timing pulses stored in the digital storage device 30 are sent as synchronizing pulses to the clock generator 45. In turn, the clock generator 45 during the record mode transmits synchronizing clock pulses to the digital framing buffer circuit 25, the digital-to-analog converter 50 and the recording device 55. The timing pulses of the digital storage device 30 are stored on the servo surface of the module. The timing pulses so stored during the record mode maintain the digital framing buffer 20, the digital to analog converter 50 and the recording device 55 in synchronism with the data as it is read from each module of the digital storage device 30. By virtue of this arrangement, the information recorded on the slave tapes S1–SN is a faithful reproduction of the information recorded on the master tape M.

In the modification of the digital storage device 30 as a solid state device, the frequency of the clock pulses generated by the clock generator 45 can be any desired frequency limited by the conversion speed of the digital to analog converter 50. The time compression rate is limited by the speed of the digital to analog converter 50 and the speed of the recording device 55 and not the speed of the digital storage device 30.

The operation of all the circuits and devices of the apparatus 10 is controlled by the microprocessor 60, which is of the type manufactured by Ithaca Intersystems, Inc. of Ithaca, N.Y., as Model System 80. Included in the microprocessor is a read only memory storing a program diagrammatically illustrated in flow charts (FIGS. 12–18).

Figure 4:
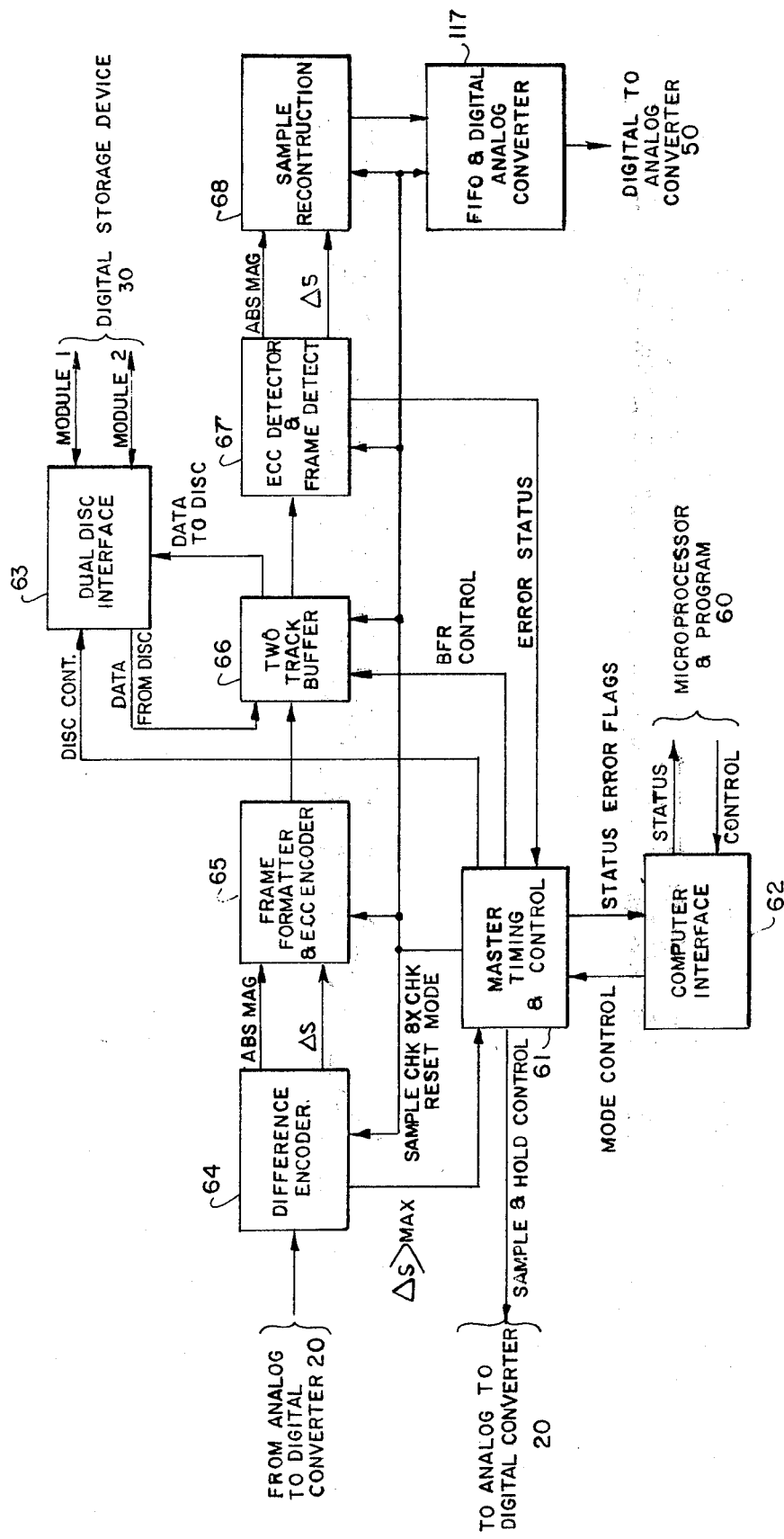
FIG. 4 is a block diagram of a digital framing buffer employed in the apparatus shown in FIG. 1.

Illustrated in FIG. 4 is the digital framing buffer 25 which comprises a master timing and control circuit 61, an interface circuit 62 to interface with the microprocessor 60, an interface circuit 63 to interface with the digital storage device 30, a difference encoder 64, a frame formatter and error check code encoder 65 and the dual track buffer 66, an error correction code detector and frame detector 67, a sample reconstruction module 68, and an interface with the digital to analog converter 50. The difference encoder 64, the frame formatter and error correction code encoder, and the dual track buffer 66 constitute the reproducer section of the digital frame buffer 25. The dual track buffer 66, the error correction code detector and frame detector 67, the sample reconstruction 68 and the interface with the digital to analog converter 50 constitute the recording section of the digital frame buffer 25.

Reproduce Mode

Figure 5:
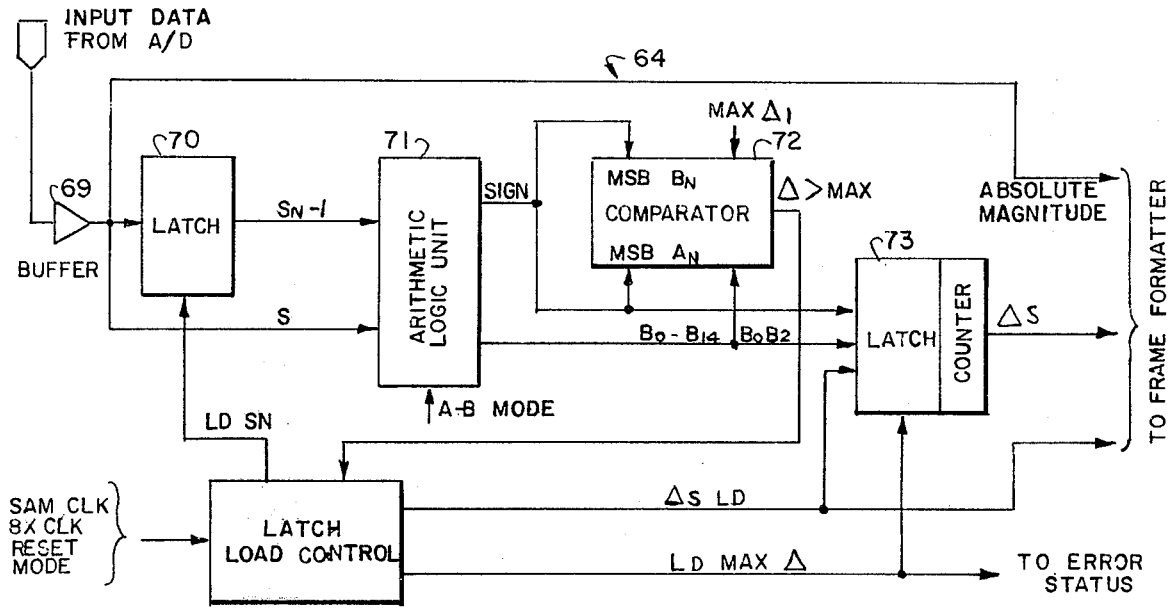
FIG. 5 is a block diagram of a difference encoder employed in the digital framing buffer shown in FIG. 4.

The output of the analog to digital converter 20 is applied to the difference encoder 64 (FIGS. 4 and 5) of the digital framing buffer 25 through a buffer 69 as 16 bit digital information in the two's complement form. The data rate is 50K hertz samples as controlled by the timing signals from the master and timing control circuit 61. The master and timing control circuit 61 provides sample and hold signals for the analog to digital converter 20 and also conversion timing signals. The incoming sampled data from the analog to digital converter 20 is applied to an arithmetic logic unit 71 and the succeeding sampled data is delayed one sample period by an input latch 70 (FIG. 5). The delayed input sample is subtracted from the sampled data by the arithmetic logic unit of the difference encoder 64. The resulting difference or delta is compared by a comparator circuit 72 with the maximum delta value represented by the resulting sign bit and the three least significant bits of all ones ($\pm 7$ units). If the delta value is less than or equal to the maximum, the delta value is stored in an output latch and counter 73. If the delta value exceeds the maximum value, the latch and counter 73 is forced to the maximum value and is incremented to record the number of times this occurs. The sixteen bit magnitude and the calculated difference are transferred to the frame formatter and error correction code encoder 65 (FIGS. 4 and 6).

Figure 6:
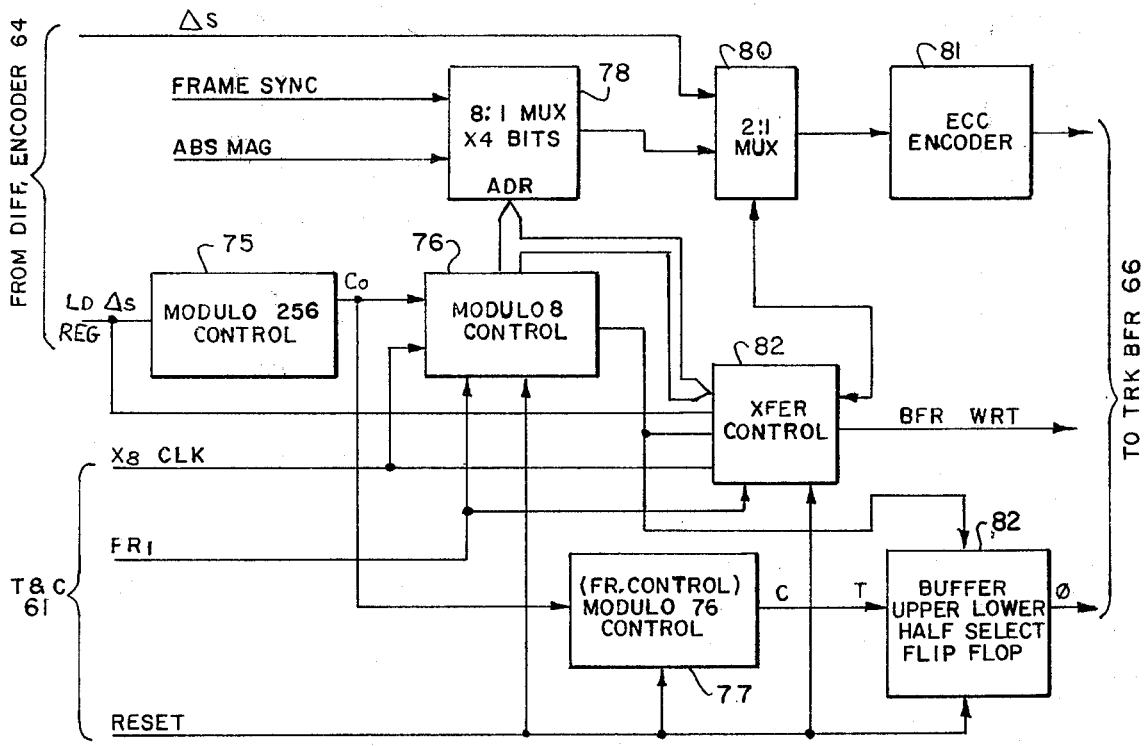
FIG. 6 is a block diagram of a frame formatter and error correction code encoder employed in the digital framing buffer shown in FIG. 4.

The frame formatter and error correction code encoder 65 is illustrated in FIG. 6. At the beginning of a recording sequence, the master timing and control circuit (FIG. 5) produces a reset pulse which clears counters 75–77 (FIG. 6) and enables the eight counter 76. The first load sample pulse from the difference encoder 64 triggers the eight counters 76. The eight counter 76 is clocked at the X8 sample clock produced by the master timing and control circuit 61. The output of the eight counter 76 is sequenced through a 8:1 multiplexer 78.

The 8:1 multiplexer 78 gates the four 4 bit segments of the frame sync code and the four 4 bit segments of the first sample magnitude through a 2:1 multiplexer 80. The output of the 2:1 multiplexer 80 is applied to an error correction code encoder 81.

The 8:1 multiplexer 78 sets a buffer upper/lower half select flip-flop circuit 82 to switch the 2:1 multiplexer 80 for transferring the 256 delta samples to the error correction code encoder 81 under the control of the 256 counter 75. The output of the module 256 counter 75 increments the frame counter 77 and triggers the eight counter to start a new frame. A transfer control circuit 82 generates a buffer write pulse for each byte as determined by the incoming strobe pulse from the difference encoder 64, the control pulses from the master timing and control circuit 61 and the state of the counters 75-77.

The 76 frame counter 77 counts the number of frames to be loaded on a track of the dual track buffer 66 and controls the buffer upper/lower half select flip-flop 82. The error code correction encoder 81 is a 32×8 PROM which is addressed by the four bit delta sample or frame sync or magnitude segment. The corresponding addressed location contains an encoded byte containing the same data bits and a four bit DED/SED Humming code.

The master and timing control circuit 61 provides all basic and control functions. Upon receipt of an initiate record command from the microprocessor 60, the master and timing control circuit 61 generates a reset pulse to synchronize distributed control functions. In the playback mode, the master and timing control circuit 61 provides the analog to digital converter 20 clock pulses for conversion and the sample and hold signals.

Figure 7:
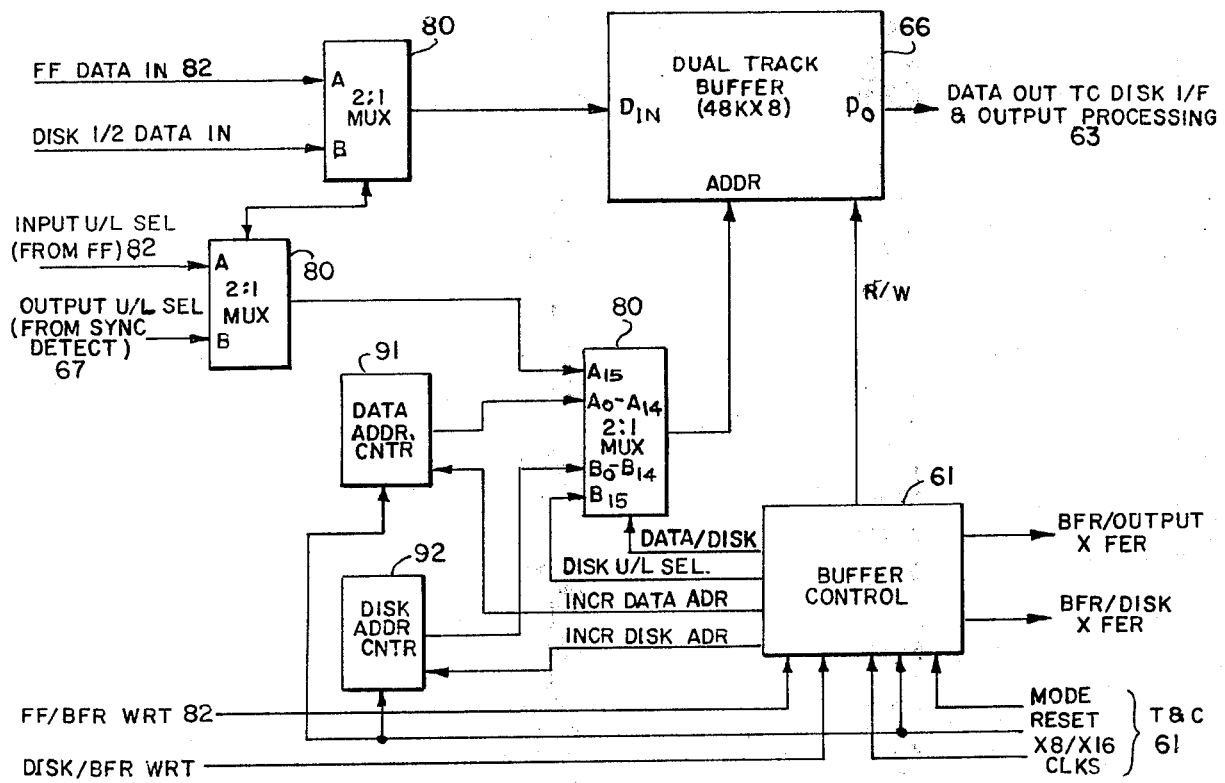
FIG. 7 is a block diagram of a portion of the digital framing buffer illustrated in FIG. 4 and particularly illustrating a dual track buffer thereof.

The dual track buffer 66 comprises 48K random access memories consisting of 16K×1 static random access memories. In the record mode, digital information is written into the buffer 66 from the frame formatter and error code correction encoder 65 and is read out of the buffer to the dual disc interface 63 (FIG. 4). In the playback mode, data from the disc interface is written into the dual track buffer 66 and is read out for processing to the digital to analog converter 50. Two address counters 91 and 92 (FIG. 7) keep the current address for the data input from the frame formatter and error code correction encoder 65 and for the data to and from the digital storage modules 36 and 37. The most significant bit of the address selects the upper or lower half of the buffer 66 and is provided from the frame formatter and error code correction encoder 64 for incoming data. The most significant bit is provided by a frame detector of the error correction code check and frame detector 67 for ongoing data and from a buffer control logic of the master and timing circuit control 61 for writing from or reading into the tracks 31 and 32 of the buffer 66. The input data and address most significant bits are selected via 2:1 multiplexer 80 and are controlled by the selection of the mode by the microprocessor 60. The buffer control of the master timing and control circuit 61 also provides the read/write clock pulses to the buffer 66 and transfers strobe pulses for data to the tracks 31 and 32 and the output processing to the digital to analog converter 50.

Figure 8:
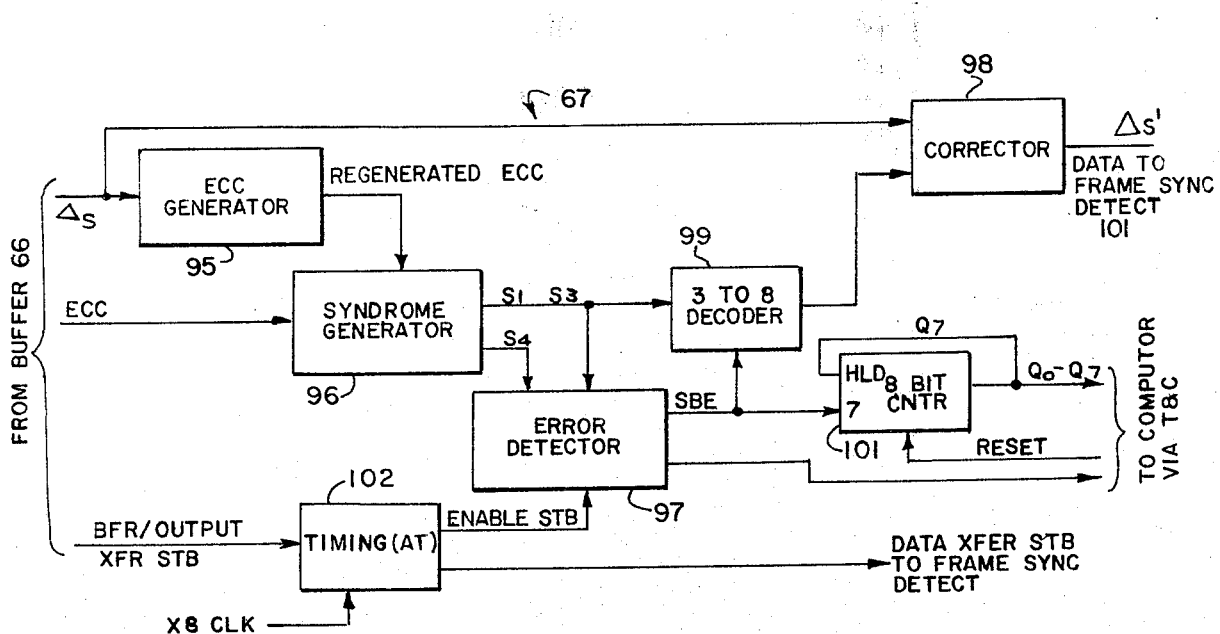
FIG. 8 is a block diagram of the error correction code detector of an error correction code detector and frame detector employed in the digital framing buffer illustrated in FIG. 4.

The error detection and correction circuit 67 is illustrated in FIG. 8. Four bits of data in the byte from the buffer 66 address an error correction code generator 95 of the error detection and correction circuit 67 to provide a regenerated error check and correction code for the data read from the buffer 66. The regenerated code is subjected to an exclusive OR operation with the incoming error correction code in the output byte of the buffer 66 applied to a syndrome generator 96 to generate the syndrome bits. The syndrome bits are interpreted in an error detector 97 to determine if a single or double bit error is present in the incoming four bits of data.

If a single bit error is detected, the three least significant bits of the syndrome bits are decoded by a 3 to 8 decoder 99 to determine which bit is in error and to invert the corresponding bit in a corrector circuit 98. If a double bit error is detected, an interrupt signal is generated in the microprocessor 60. An eight bit counter 101 keeps count of the single bit errors up to a maximum count of 225, which may occur during a playback mode. This count may be monitored by the microprocessor 60 at the end of a playback mode. The four bit output from the corrector circuit 98 is transferred to a frame detector (FIG. 9) of the error correction code detector and frame detector 67.

Figure 9:
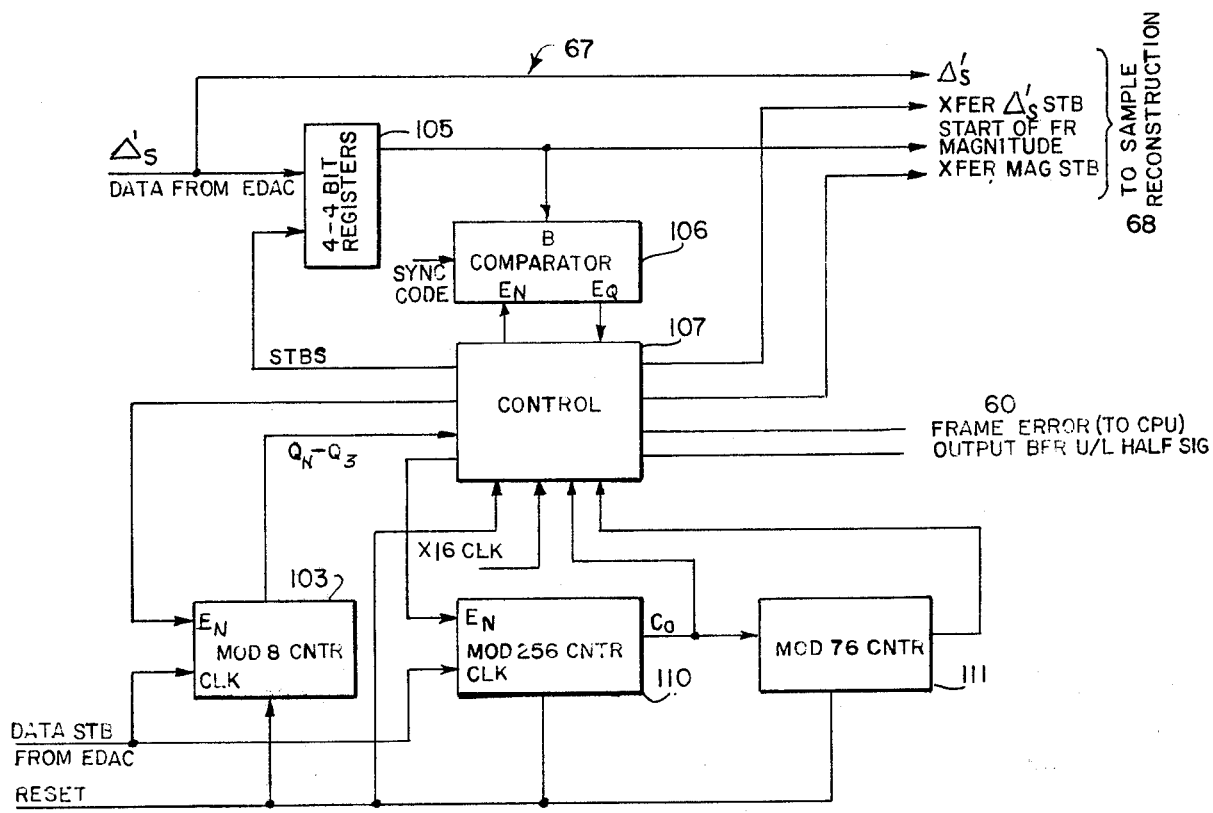
FIG. 9 is a block diagram of a frame detector of the error correction code detector and frame detector employed in the digital framing buffer illustrated in FIG. 4.

The error correction code detector and frame detector 67 comprises a frame detector (FIG. 9). Following a reset pulse, the first data transfer strobe pulse from a timing circuit 102 (FIG. 8) triggers a eight counter 103 (FIG. 9). The eight counter 103 stores the first four data samples in four 4 bit registers 105 and then enables a comparator circuit 106 to compare the contents of the registers 105 with a hardwired sync code. The first data transfer strobe is applied from the buffer 66 to the timing circuit 102.

If an error is detected between the contents of the registers 105 and the hardwired sync code, a frame error interrupt signal is generated in a control circuit 107 for transmission to the microprocessor 60. If no error is detected between the contents of the registers 105 and the hardwired sync code, the next four samples are loaded into the registers 105 and then transferred to the sample reconstruction circuit 68 as the beginning of the frame magnitude. The succeeding 256 delta values are transferred into the sample reconstruction circuit 68 by counting the transfer strobe pulses with the module 256 counter 110. The output of the 256 counter 110 retriggers the eight counter 103 to start a new frame sync detect cycle and also step a 76 counter 111 to count the number of frames per track. The output from the 76 counter 111 toggles the buffer upper/lower half select flip-flop 82 (FIG. 6) for reading the next track from the dual track buffer 66 (FIG. 4).

Figure 10:
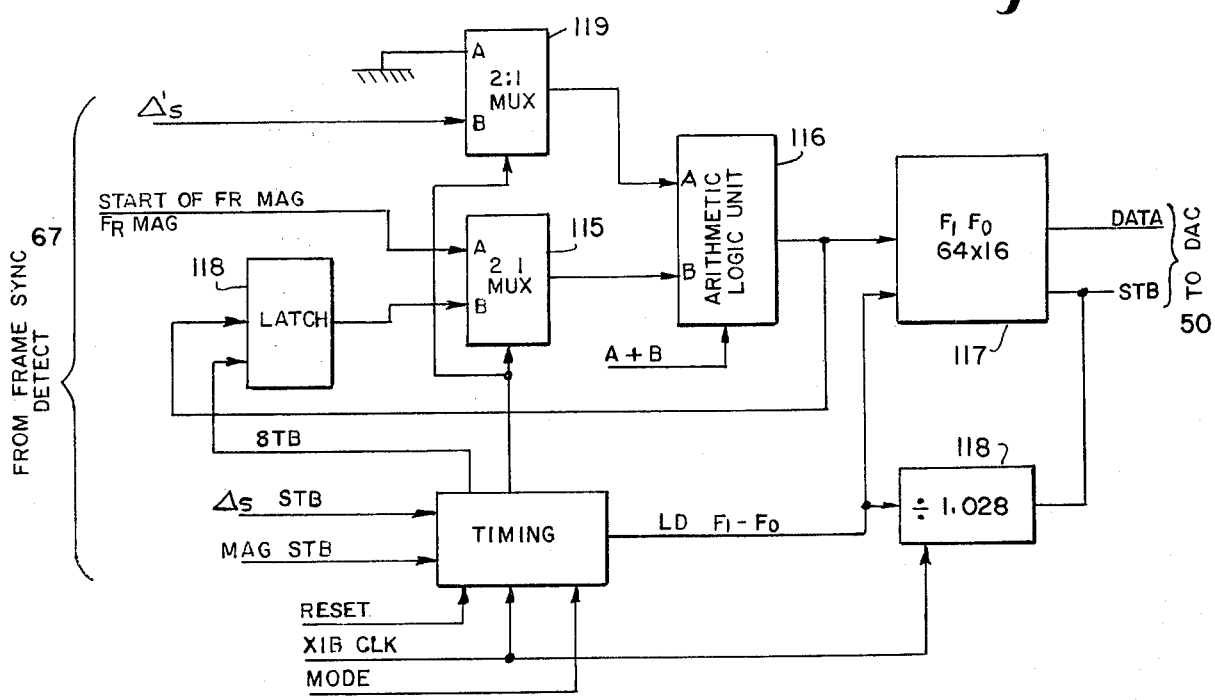
FIG. 10 is a block diagram of a sample reconstruction and output first-in-first-out register employed in the digital framing buffer illustrated in FIG. 4.

Illustrated in FIG. 10 is the sample reconstruction circuit 68 and output first-in first out register 117. At the beginning of a frame, the reference magnitude is advanced through a 2:1 multiplexer 115 to one input of an arithmetic logic unit 116. Another input of the arithmetic logic unit 116 is set at zero by a 2:1 multiplexer 119. The output of the arithmetic logic unit 116 equals the unchanged reference magnitude which is loaded into the output first-in-first-out register 117 and latch 118 containing the last sample magnitude and the incoming delta values are advanced to the arithmetic logic unit 116 by the multiplexers 115 and 119. The delta values are added algebraically to the previous magnitude to generate the new magnitude.

There are four output sample periods for each frame during the frame sync detection during which data is not loaded into the output first-in first out register 117. To ensure continuous data output without gaps, the output sample clock is downsampled by a rate multiplier 118 to generate an output strobe equivalent to 0.975 times the load rate of the first-in first out register 117. Since the same number of samples are read out as are loaded during a frame period, the register 117 cannot overflow.

The disk interface circuit 63 provides the necessary control to transfer data to and from the digital storage modules 36 and 37. The interfaces are bit and byte serial, and transfer at the disk rate of 1.2 M bytes per second.

Record Mode

As previously discussed, a record mode is initiated by the microprocessor 60. The start command of the microprocessor 60 resets the control logic and synchronizes the digital buffer frame 25 with the master tape reproducing device 15. Prior to the microprocessor 60 initiating the record mode, the microprocessor 60 positions the disk heads of the digital storage modules 36 and 37 to track zero. The master timing and control circuit 61 of the digital framing buffer 25 supplies a 50 Hz sampling clock to the analog to digital converter 20 and stores a track of data on the lower half of the buffer memory 66.

Figure 11:
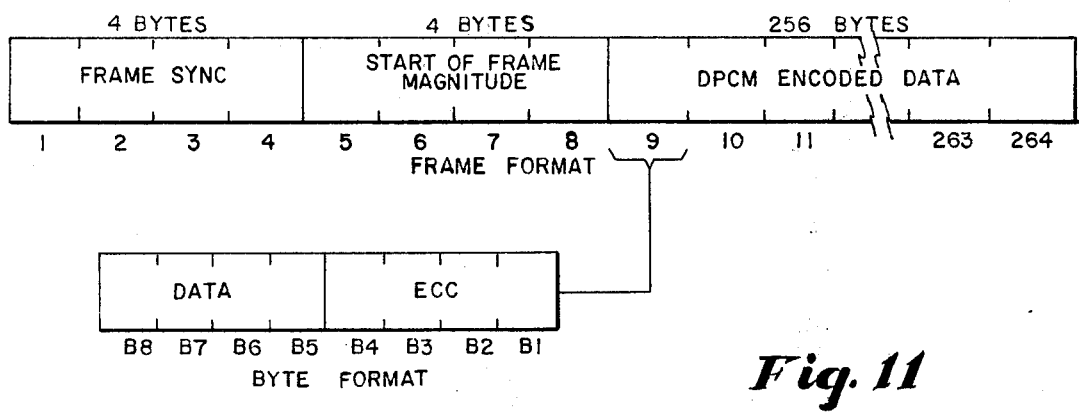
FIG. 11 is a diagrammatic illustration of a frame and byte format employed in the apparatus shown in FIG. 1.

A track length consists of 76 frames of data. A frame consists of a 16 bit sync word, a start of frame sample magnitude of 16 bits and 256 differential pulse code modulation encoded samples of four bits as shown in the frame format of FIG. 11. The complete frame contains 261 bytes of information in which each byte contains four bits of data, namely: sync, magnitude or delta. Each byte also contains bits of a double error detect/single error correct Hamming code. The differential pulse code modulation encoded samples represent the difference in magnitude between successive samples from the analog-to-digital converter 20. The start of the frame magnitude provides the starting reference for the encoded delta samples in the frame. Each frame represents 257 samples of the incoming data. Hence, each track contains a total of 76×257=19,532 samples which represent 0.39064 seconds of data in real time. When the 76 frames have been stored, the buffer 66 switches to the upper half thereof for storing the incoming data and initiates a transfer of the lower half to the register 31, track 0. The number of frames per track is equal to 20,169 bytes per track divided by 264 bytes per frame. This is equal to 76.39 or approximately 76 frames per track.

The data in the buffer 66 is transferred to the modules 36 and 37 of the digital storage device 30 at 1.2 megabytes per second when the track origin status is received from the modules 36 and 37 signifying that the record head is positioned at the beginning of the track of the modules 36 and 37. A transfer from the modules 36 and 37 requires a maximum time of two complete revolutions of the modules 36 and 37. One revolution may be required to reach the beginning of the module. On completion of the transfer, the module record head is positioned on the next track. When the next track of data has been loaded in the upper half of the buffer 66, the buffer 66 again switches to the lower half which has already been transferred to the module 36. The buffer 66 initiates a transfer of the upper half thereof to the module 36, track 0. The sequence of alternating loading and transferring the lower and upper halves of the buffer 66 to the modules 36 and 37, respectively, continues until the complete record has been stored on the modules 36 and 37. The microprocessor 60 terminates the recording mode by initiating a STOP command.

A record mode is initiated by first transferring track 0 of the modules 36 and 37 into the lower and upper halves of the dual track buffer 66, respectively. As each half of the buffer 66 is transferred to the digital to analog converter 50 through the output register and interface circuit 117 (FIG. 4), the track is loaded with the next track of data from the associated module of the digital storage device 30. Again, the transfer of a track of data from a module to the digital storage device 30 requires a maximum of two revolutions. However, once the transfer begins from the track origin, it is completed at the 1.2 M byte rate (833 manoseconds per byte). To maintain a continuous flow of data to the digital analog converter 50, and to ensure that the buffer 66 is ready to accept the next track, it must be emptied at a constant rate within 833 nanoseconds per byte. After the lower half of the buffer 66 has been emptied, the digital frame buffer 25 transfers to the upper half of the buffer 66 and the lower half of the buffer 66 is filled with the next track of the module 36. The reading of the upper half of the buffer 66 and the writing of the lower half of the buffer 66 are interleaved with one write cycle occurring for every read cycle for the 16.6 millisecond period during which the transfer from the module of the digital storage device 30 to the buffer 66 occurs.

As the data is read from the buffer 66, the digital frame buffer 25 checks the error code on each byte and checks for the proper frame sync code in each frame. If a noncorrectable double bit error or sync error is detected, the digital frame buffer 25 notifies the microprocessor 60. A count of single bit errors is maintained in the digital frame buffer 25 which can be accessed by the microprocessor 60 following each playback session. A large number of error occurrences could indicate a malfunction condition.

After the frame sync is verified, the START OF FRAME MAGNITUDE from the frame detector 67 is applied to the digital to analog converter 50 and stored in the register 117. The next delta value is then added algebraically to the magnitude to generate the magnitude represented by the delta value. The new value is applied to the digital to analog converter 50 and stored for generation of the next sample magnitude.

Microprocessor and Program

The microprocessor 60 includes a read only memory which stores a program for controlling and monitoring the apparatus 10. Through this arrangement, analog information stored on the master tape M is reproduced from the master tape M and stored in the digital storage device 30 as digital information and digital information stored in the digital storage device 30 is recorded on slave tapes S1-SN as analog information. The microprocessor 60 sends command signals over control bus 120 and reads status signals over status bus 121 for the following:

reproducing device 15
    analog to digital converter 20
    digital framing buffer 25
    digital storage device 30
    digital to analog converter 50
    recording device 55.

The microprocessor 60 performs three major functions, namely:

recording algorithm setup;
    data collection control and monitoring; and data reproducing control and monitoring.

Figure 12:
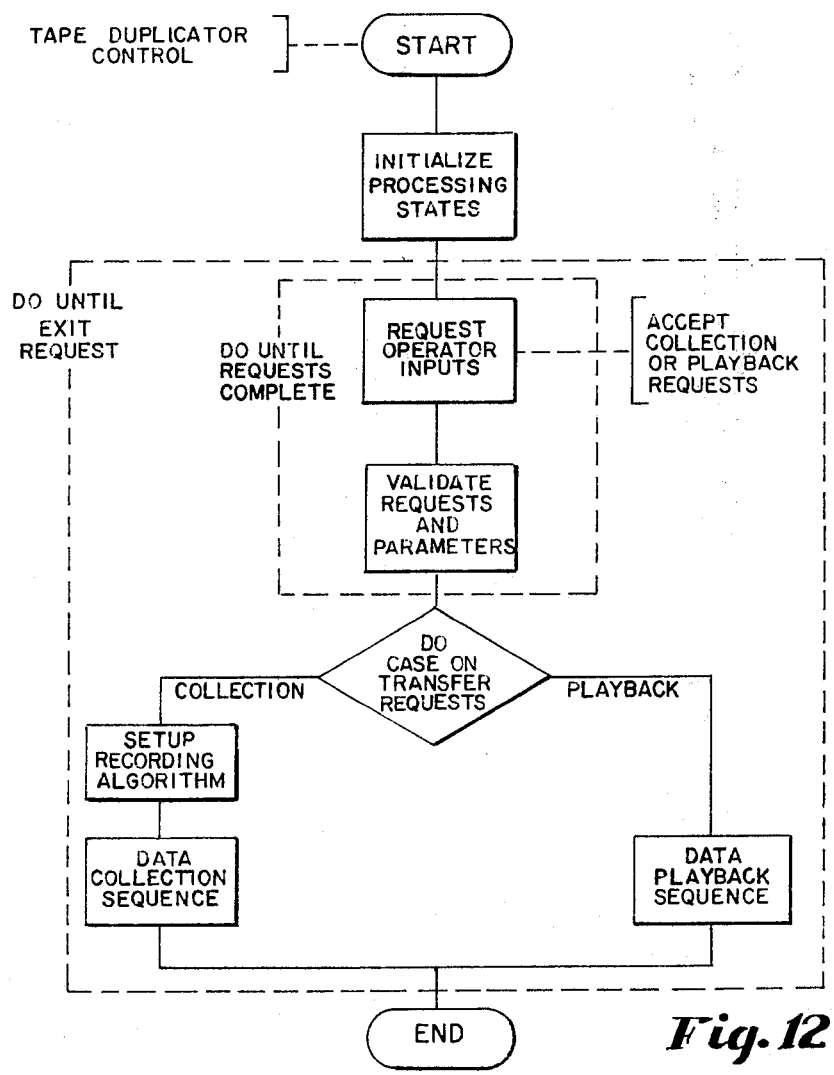
FIG. 12 is a program flow diagram of control exercised by a microprocessor employed in the apparatus shown in FIG. 1.
Figure 13:
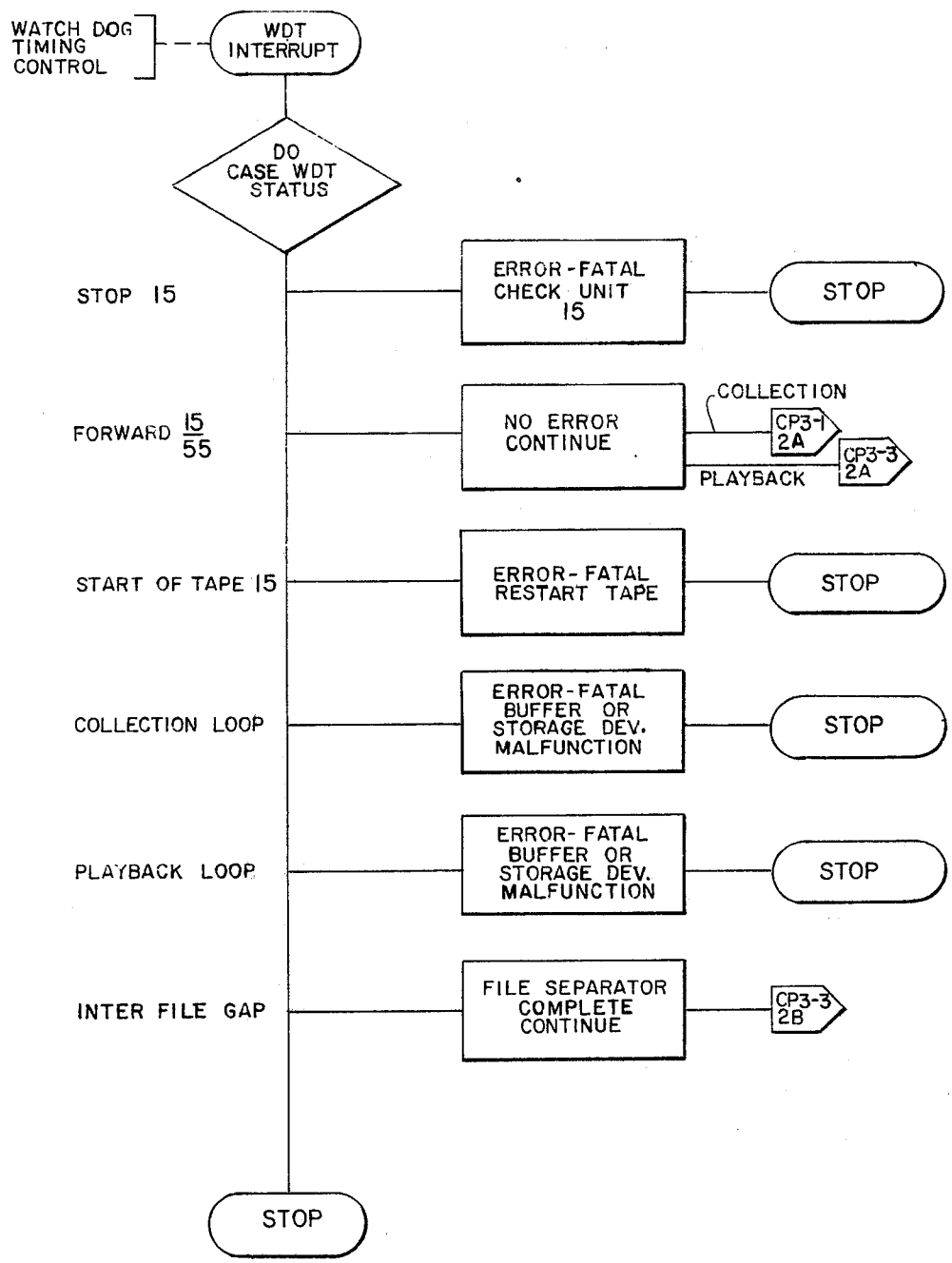
FIG. 13 is a flow diagram for a watch-dog timer embodied in the microprocessor employed in the apparatus shown in FIG. 1.

In FIG. 12 is a flow diagram illustrating the three major functions above delineated.

The microprocessor 60 under the control of an operator issues a command for data collection operation, which is reproducing information from the master tape M for storage in the digital storage device 30 and a command for data playback operation, which is recording on the slave tapes S1-Sn information stored in the digital storage device 30. From various keyboard operations or other input controls, the microprocessor 60 will determine the characteristics for the digital storage of the data stored in the digital storage device 30 and the data recorded on the slave tapes S1-SN generated by the data playback function.

The apparatus 10 is operated under the control of the microprocessor 60 either to collect data or to playback data. These operations are not performed simultaneously, but are performed at different times. The above delineated components, namely: the reproducing device 15, analog to digital converter 20, digital framing buffer 25, digital storage device 30, digital to analog converter 50 and recording device 55 are initialized, controlled, monitored and stopped by the microprocessor 60 in the collection of data and in the playback of data. The microprocessor 60 collects and records statistics on data transfers and error conditions during data collection (reproducing data from the master tape M for recording in the digital storage device 30) and during data playback (recording data on the slave tapes S1-SN reproduced from the modules of the digital storage device 30.)

Included in the microprocessor 60 is a watch dog timer (FIG. 13) which monitors all operations for timely completion. The watch dog timer is recycled at the beginning of each operation that must be time monitored. A control signal is entered if the timer expires to redirect processing control based upon the incomplete operation for a prescribed period of time.

The data collection function will reproduce monaural or stereophonic analog data in various formats and will store the corresponding digitized data on the modules 36 and 37 for data stored on a recorded track of the master tape M. The storage of the data in the digital storage device 30 will be retrieved or reproduced for recording on slave tapes S1-SN simultaneously and optionally during successive recording operations.

The data recording or playback operation will retrieve data from the modules 36 and 37 of the digital storage device 30 and will record this data in sequence on the simultaneously driven slave tapes S1-SN.

In the recording of the algorithm setup, the microprocessor 60 initially gathers from the operator information about data recorded on the master tape M. This information is used by the microprocessor 60 to adjust the collection or playback sequences and to enhance the flexible of the operations. The recording algorithm setup flow begins by initializing processing status for the program. Text is displayed at the operator's station requesting information about the data recorded on the master tape M during the data collection sequence (reproducing data from master tape M) and the data playback sequence (recording data on slave tapes S1-SN). When the operator observes valid text information, the operator elects to collect or playback and processing flow follows either the data collection sequence or the data playback sequence.

Figure 14:
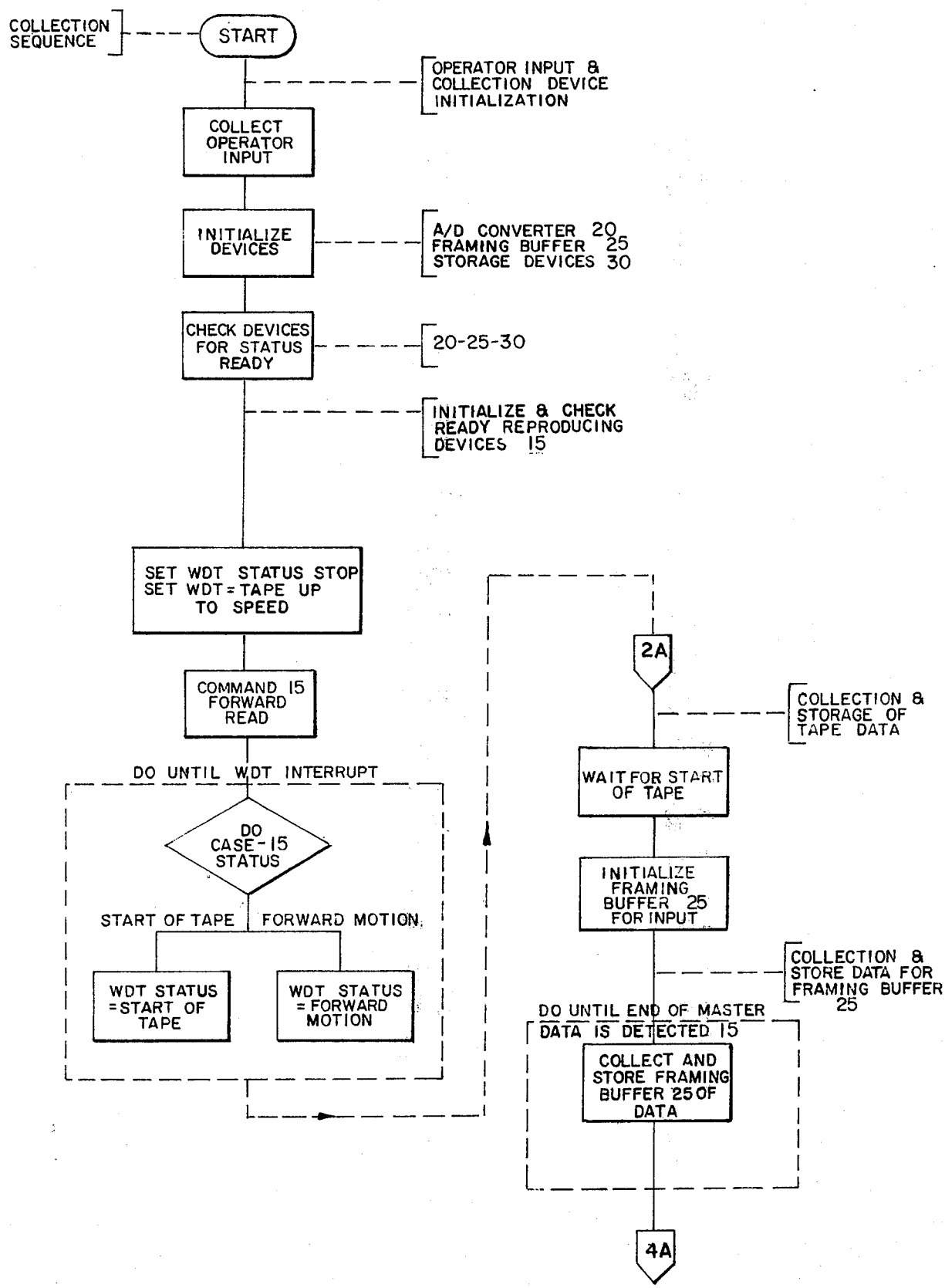
FIGS. 14 and 15 with FIG. 14 placed above
Figure 15:
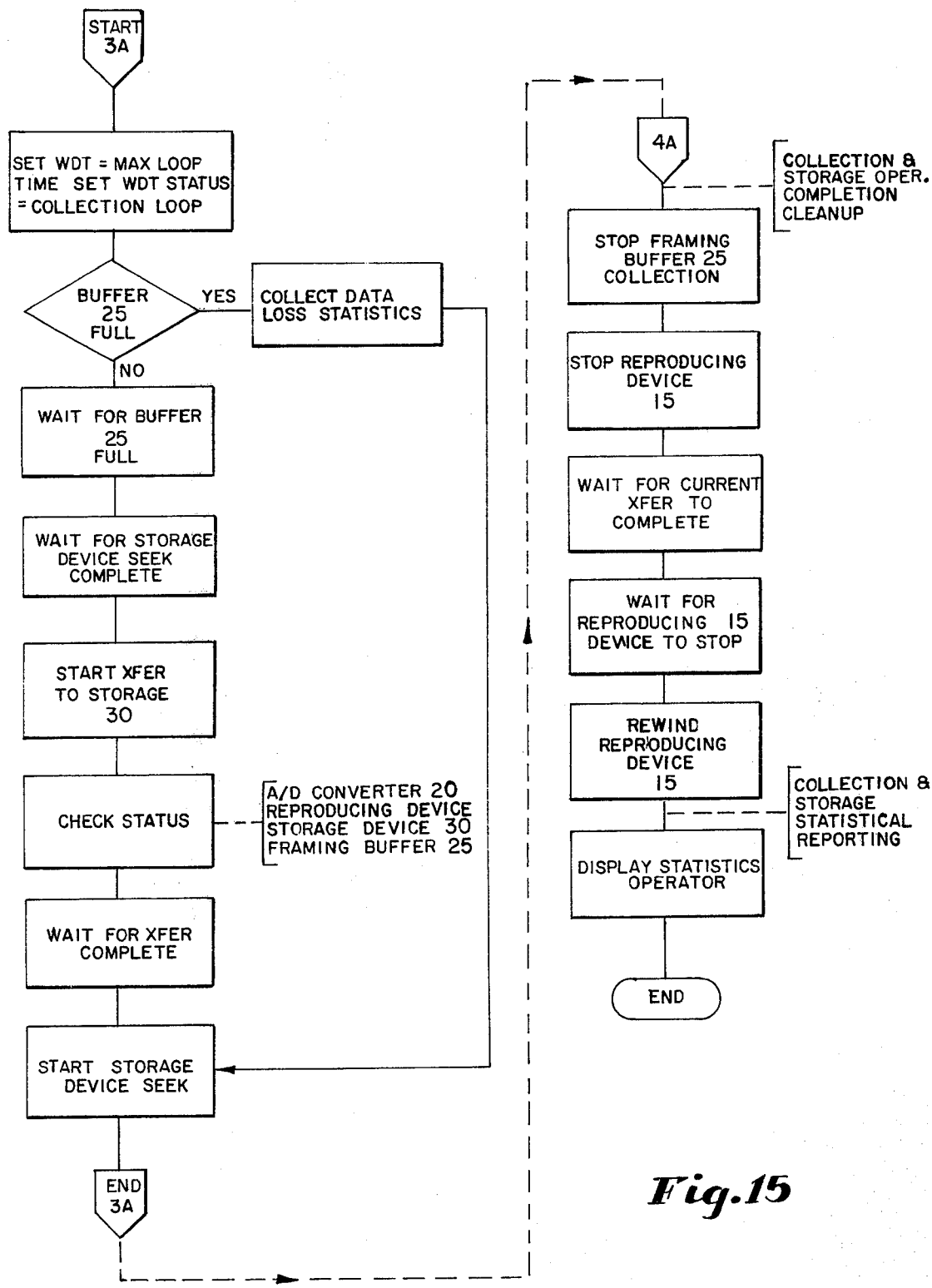

Illustrated in FIGS. 14 and 15 with FIG. 14 placed above FIG. 15 is a data collection flow diagram of the program for the microprocessor 60. The data collection sequence includes three major operations, namely:
 operator keyboard data and collection devices initialization;
 Collection and storage of master tape data; and
 collection and storage of statistical reporting.

The operator keyboard data and collection devices initialization operation uses operator keyboard data of the amount of time for each selection on the master tape M to estimate the amount of storage device required for the storage of data in the digital storage device 30. If there is sufficient storage space in the digital storage device 30, all the collection devices are initialized or commanded to a known state and checked for ability to begin collection and storage. Any error in operator keyboard data or collection devices initialization will cause the data collection sequence to stop and a report to be made to the operator.

The operator input and collection devices initialization flow includes a collection of operator keyboard operations followed by the commanding of the analog to digital converter 20, commanding of the framing buffer 25, and commanding of the digital storage device 30 to a known state for the start of the collection and storage of the data reproduced from the master tape M. Each commanded device status is checked to ensure the device reached an initial state. To initialize the reproducing device 15, the watch dog timer of the microprocessor 60 is set to interrupt processing flow incomplete upon the expiration of the time set for the watch dog timer. The time set in the watch dog timer is the number of milliseconds required for the master tape M to come up to rated speed from a dead stop. After the time has expired, the watch dog timer routine is entered into the microprocessor 60. Between the time the watch dog timer is set and the expiration time for the watch dog timer, the status of the watch dog timer is set to determine processing flow in the routine of the watch dog timer (FIG. 3). In the event the master tape M is not activated or a start of tape indicator was not read during the time period the master tape M is to reach its rated speed, the initialization process stops and the operator must reset the tape to begin again.

During the reproducing of data from the master tape M and the storage of retrieved data in the digital storage device 30 the microprocessor 60 checks the devices collecting the data from the reproducing device 15 through the analog to digital converter 20 to the digital framing buffer 25 and commands the storage device 30 to accept and store data from the digital framing buffer 25. Statistics concerning the quality of the collection and storage of data are collected and stored for output during the collection and storage of master tape data. Detection of data lost will not necessarily stop the operation of the apparatus 10, the failure of a device to complete a command (e.g. failure to seek storage device track and sector or failure to complete transfer from the framing buffer 25 to the digital storage device 30) will stop the operation of the apparatus 10.

The collection and storage of data flow is entered after the master tape M has reached the rated speed within the time limit set by the watch dog timer and the master tape M has been activated and no start of the master tape M has been read. When the start of the master tape M is detected, the digital framing buffer 25 is commanded by the microprocessor 60 to begin the storing of data. The tracks 31 and 32 store data in an alternate sequence after each track is full. The digital storage device 30 is conditioned for the acceptance of data by the microprocessor 60 and the microprocessor 60 initiates the transfer of data to the modules 36 and 37 from the tracks 31 and 32 of the digital framing buffer 25. At the start of the collection loop, the watch dog timer is reset to the maximum allowable time for one collection loop execution. The watch dog timer status is set to process a collection loop error.

In the event a track of the digital framing buffer 25 on which data is to be stored is full, data is lost and data loss statistics are gathered. Otherwise, execution waits for the track of the digital framing buffer 25 to become full. This event is followed by a delay for the storage device 30 to become conditioned for the succeeding data transfer. When the conditioning of the storage device 30 is complete, a command from the microprocessor 60 to start the data transfer is emitted. The status of the analog to digital converter 20 and the status of the reproducing device 15 are read by the microprocessor 60 and the results of the reading are stored therein.

In the event the status of the reproducing device 15 indicates the end of the master tape M to the microprocessor 60, the data stored in the data storage device 30 is ready for discharge. Otherwise, the microprocessor 60 delays the data transfer from the data storage device 30 until the data storage in the data storage device 30 is complete. Upon completion of the storage of data in the data storage device 30, the microprocessor 60 emits a command signal to recondition the data storage device 30 to accept data (start seek). The entire sequence is alternately performed by track 31 of the digital framing buffer 25, the module 36 of the digital storage device 30, and then the track 32 of the digital framing buffer 25, the module 36 of the digital storage device 30.

In the event an end of tape mark on the master tape M is read by the microprocessor 60, the microprocessor 60 emits a command signal to stop the operation of the reproducing device 15 and to stop the collection of data by the data framing buffer 25. To ensure the complete collection of data, processing under the direction of the microprocessor 60 waits for the current transfer of data from the master tape M to be complete. After the reproducing device 15 stops, the microprocessor 60 sends a command to the reproducing device 15 to rewind the master tape M.

The collection and storage statistical reporting operation displays statistics gathered during collection and storage to enable the operator to determine the quality of the collection and storage of the tape data operation.

Data Playback Sequence

The data playback sequence (recording data on the slave tapes S1-SN) includes three operations:
 storage and recording devices initialization;
 retrieval and playback of data from the digital storage device 30; and
 retrieval and playback statistical reporting.

Figure 16:
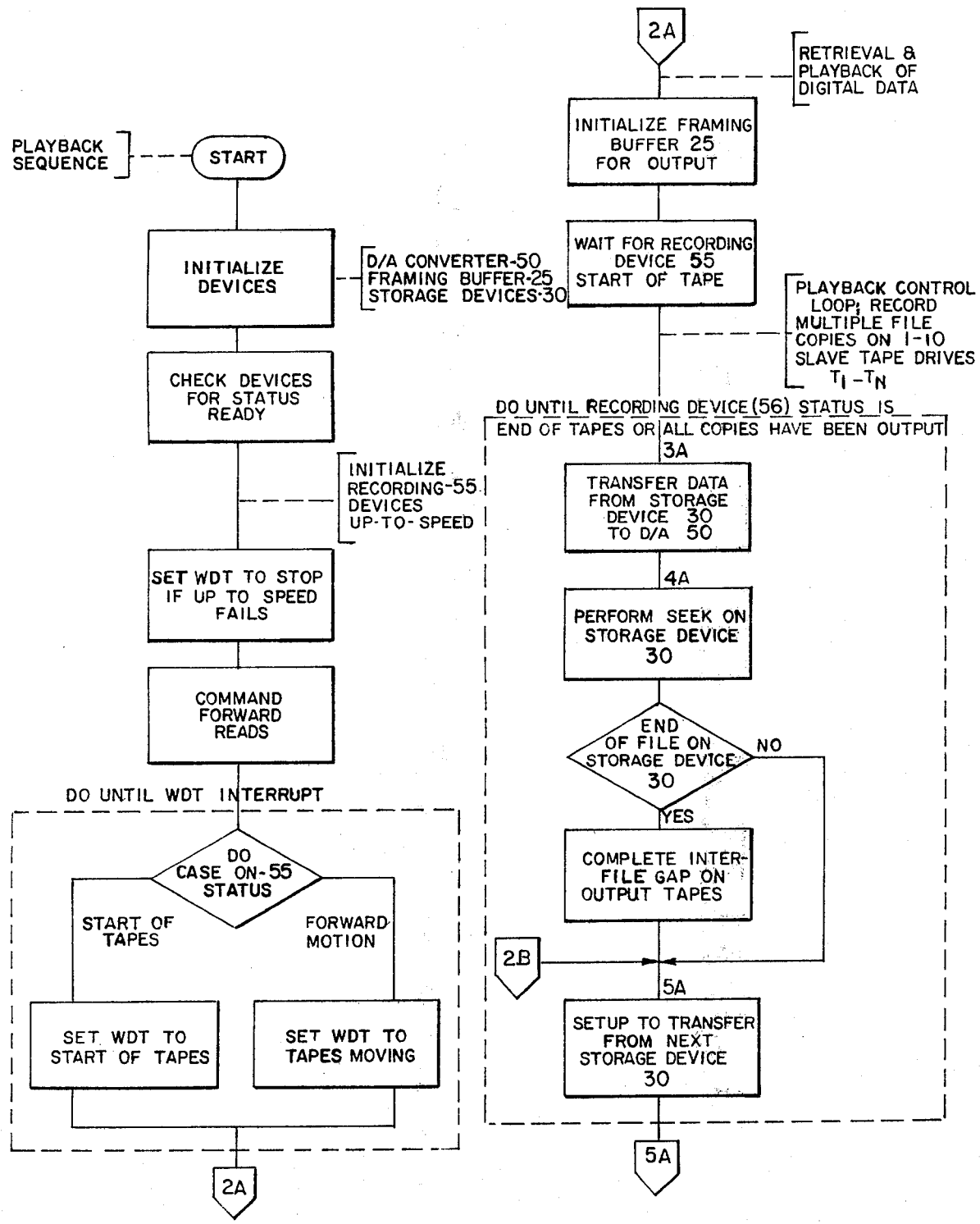
FIGS. 16–18 with FIG. 17 placed below FIG. 16 and FIG. 18 placed below
Figure 17:
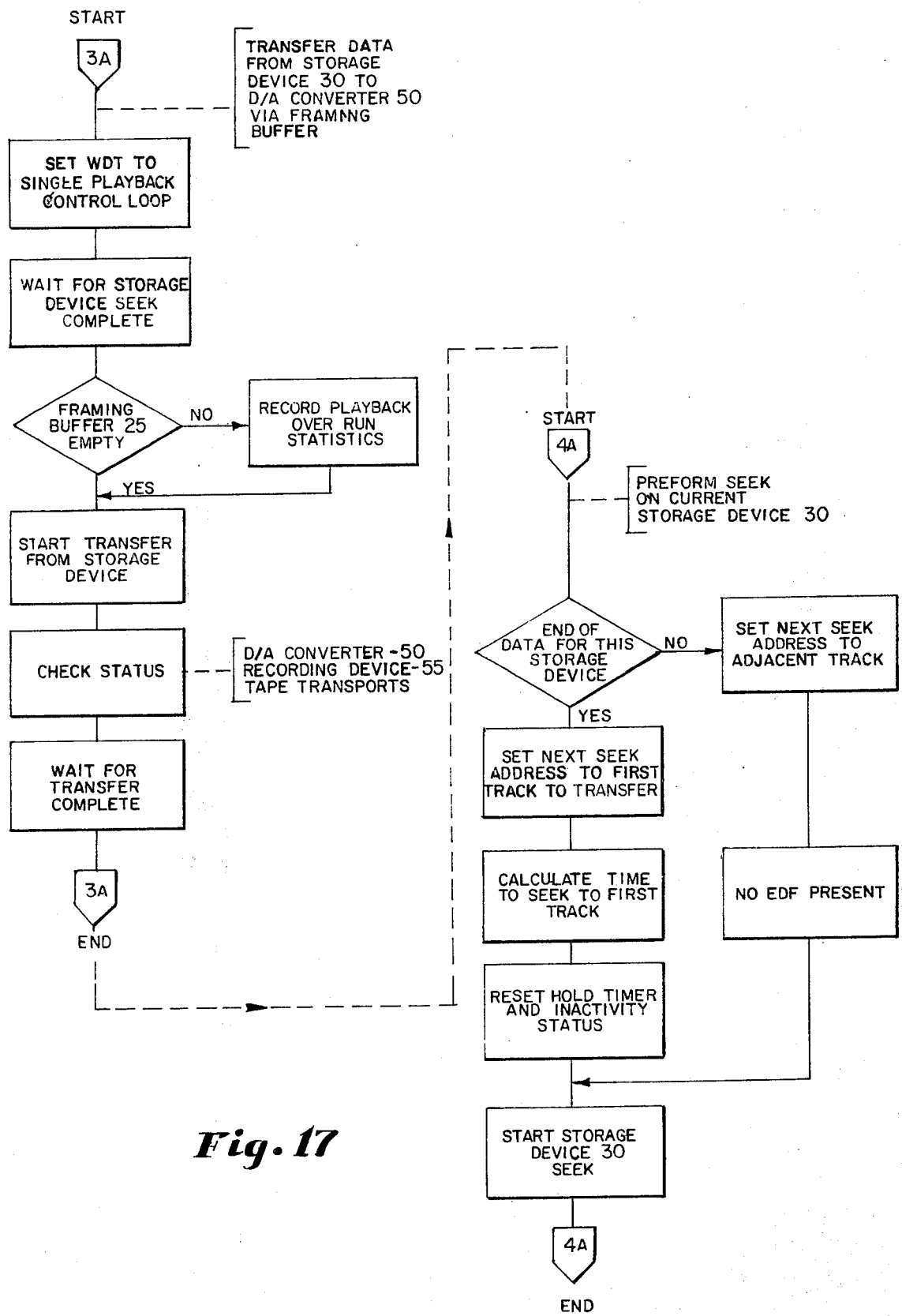
Figure 18:
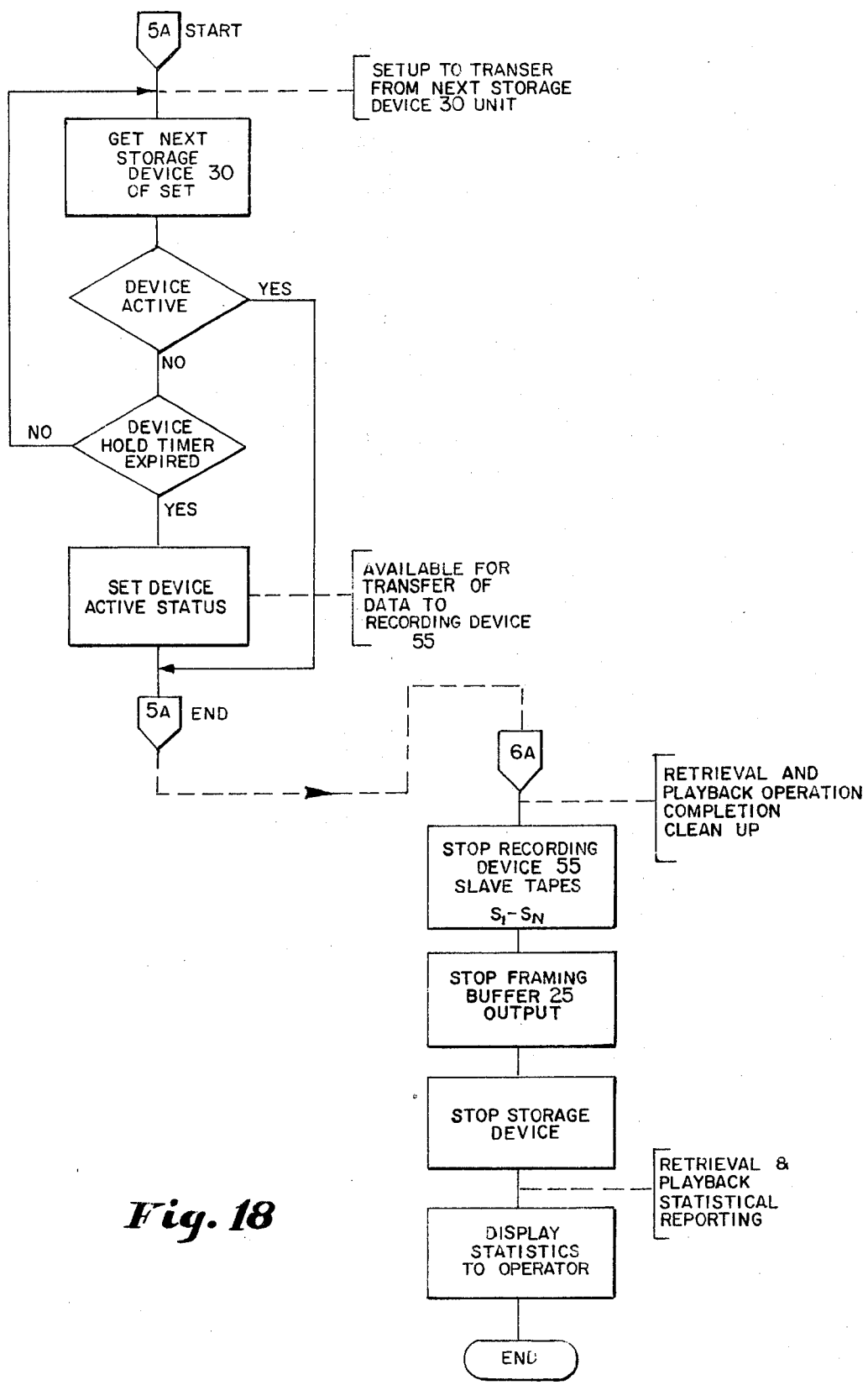

Illustrated in FIGS. 16-18 is the data playback flow diagram in which FIG. 17 is placed below FIG. 16 and FIG. 18 is placed below FIG. 17.

The device initialization operation uses information supplied to the microprocessor 60 by an operator through a keyboard and the like and uses information from the data collection operation to establish the recording controls and to determine the manner in which each device is to be initialized. Each device that is used in the sequence for recording data on the slave tapes S1-SN is checked by the microprocessor 60 for ability to begin data retrieval from the data storage device 30 and playback the data retrieved from the digital storage device 30. If any device cannot be initialized this sequence is stopped and a report is given to the operator.

The control flow of the storage and recording device initialization operation consists of commanding the modules 36 and 37 of the digital storage device 30 to a known state and verifying that the proper data is available from the medium as mounted on each module. The operation continues by the microprocessor 60 commanding the digital to analog converter 50, the output function of the digital framing buffer 25 and the recording device 55 to their initial states, respectively, for the start of data retrieval and playback.

Each module of the digital storage device 30 is commanded by the microprocessor 60 to seek the first track of digitized data to prepare for the initial transfer. The slave tape transports T1-TN are initialized by the microprocessor 60 by commanding each transport required for recording to begin forward motion. The slave tape transports T1-TN are continuously checked by the microprocessor 60 for forward motion status until the transports are up to speed. This initialization is performed under timeout control of the watch dog timer which is set for the time necessary for the transports to come up to speed. If any errors are detected during these operations, the sequence is stopped and must be restarted by the operator.

If initialization is successful, control passes to the retrieval and playback of digital data from the digital storage device 30. This operation leads to the recording of digital data to be recorded in analog form on the slave tapes S1-SN through the recording device 55. The microprocessor 60 monitors and directs the retrieving of data alternately from the modules 36 and 37 of the digital storage device 30 for application to the digital to analog converter 50 through alternate tracks 31 and 32 of the digital framing buffer 25. The microprocessor 60 ensures the reproduction heads of the tracks 31 and 32 and of the modules 36 and 37 are set correctly and provides a continuous stream of data to the recording device 55.

Statistics recording the number and quality of data file retrievals and tape playback operations performed are stored for output at the end of the data playback sequence. Data overrun errors detected during playback of a single recording of the data file will not terminate the sequence but will be reported as part of the playback statistics. Device errors, however, will cause the sequence to be stopped immediately.

The retrieval and playback of digital data operation flow is entered after the tapes are up-to-speed. The first track of the digital framing buffer 25 is commanded to begin collecting data and the start of slave tapes is detected before the actual playback loop begins.

As in the data collection logic, data stored on the alternate modules of the data storage device 30 is retrieved from alternate tracks of the digital framing buffer 25 and are subsequently directed to alternate tracks of the digital framing buffer 25 from the modules of the data storage device 30. The modules of the data storage device 30 are associated with corresponding tracks of the digital framing buffer 25 and data is directed from the digital storage device 30 by the microprocessor 60 reading the data playback sequence stored in its read only memory. Additionally, this sequence will control the retrieving of data from the modules of the data storage device 30 and the retrieving of data from the tracks of the digital framing buffer 25 to provide for multi-track tape reproductions.

At the start of each playback control loop, the watch dog timer is set or reset to the maximum time that may elapse before the next segment of data must be retrieved from application to the recording device 55 and the status is set to playback loop error. The loop then waits for the storage device 30 to become ready for the data transfer (seek complete). If the framing buffer 25 to which the data will be directed from the digital storage device 30 is not empty at this point, data may be lost due to a track overrun. Statistics are gathered of these events for later reporting. The command to start the data transfer is issued by the microprocessor 60. Various statuses are read, processed and stored by the microprocessor 60 for the digital to analog converter 50, recording device 55, digital storage device 30 and slave tape transports T1-TN. If any significant error status is detected, or when the last data of the master tape M has been applied to the tape transports T1-TN, the loop is exited. Otherwise, the loop waits for the completion of the transfer from the data storage device 30.

Upon completion of the transfer of data from the data storage device 30, the data storage device 30 is commanded by the microprocessor 60 to seek the next retrieval location. This is an adjacent track of the digital framing buffer 25, or the first track of the storage if all the tracks have now been retrieved and transferred. In the event all tracks of the digital framing buffer 25 have been retrieved and transferred, this loop reestablishes tape output control signals, such as hold time or time delay, that will be applied before there is an output of a new set of data from the digital storage device 30.

When all modules of the digital storage device 30 have transferred the last track of data from the digital framing buffer 25, the playback control loop cancels the normal watch dog timer signal and resets the watch dog timer for a fixed time during which no data is applied to the recording device 55. This provides silent data. Demarcation on the slave tapes S1-SN for the separation of the segments is reproduced from the master tape M.

At the completion of an intermediate transfer or of the demarcation timer, the next module of the storage device from which data is to be retrieved is controlled by the microprocessor 60. Devices whose hold times have not expired, or devices that are not considered active, are not conditioned for transfer. When all the data from the master tape M has been transferred for application to the slave tape transports T1-TN, the playback control loop is exited. Commands to stop all devices in the slave tape record mode are issued by the microprocessor 60. The retrieval and playback statistical reporting operation displays statistics gathered during the playback control loop to enable the operator to determine and to analyze the quality of the devices in the slave tape record mode.

Figure 2:
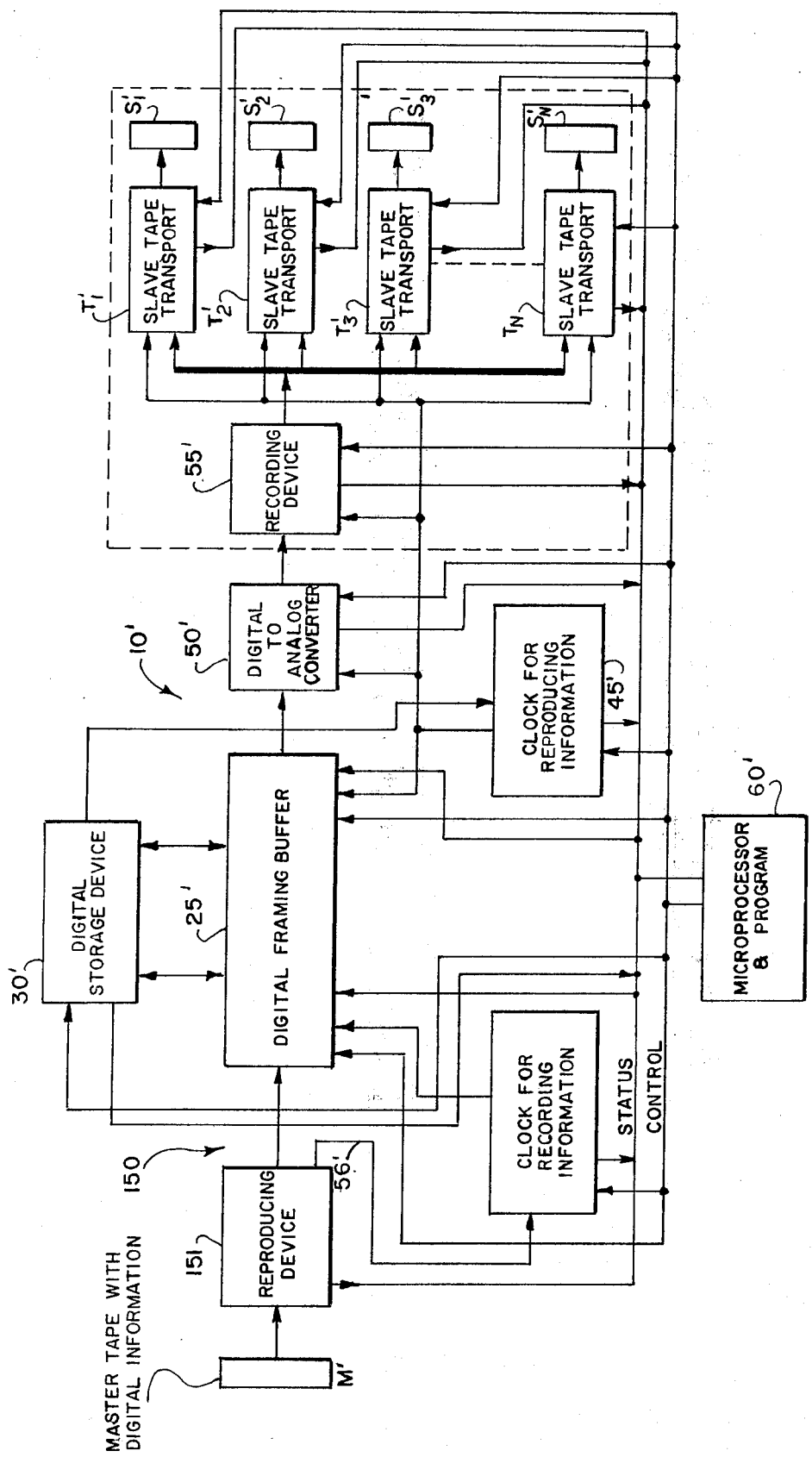
FIG. 2 is a block diagram of a modification of the apparatus employing the present invention for recording digital information reproduced from a master medium onto a slave medium in an analog format employing digital techniques.

Illustrated in FIG. 2 is the apparatus 150 embodying the present invention for recording on slave media S'1, S'2, S'3-S'N analog information from a master medium M' with digital information recorded thereon. While the media, in the exemplary embodiment, are conventional magnetic tapes with digital information recorded thereon, it is apparent that the media may be in the form of conventional magnetic discs and the like with digital information recorded thereon. The master tape M' may be single channel monaural or dual channel stereophonic. For each channel over one, the operating components hereof may be repeated.

The apparatus 150 of the present invention comprises a well-known digital reproducing device 151, such as reproduce tape transport manufactured by 3M Corporation of St. Paul, Minn. as Model DMS-4. The master tape M' having digital information thereon is mounted on the reproducing device 151. The speed at which the master tape M' rotates is the same as the speed for recording the digital information on the master tape M'.

Components of the apparatus 150 (FIG. 2) similar in construction and operation to the components of the apparatus 10 (FIG. 1) are designated by the same reference numeral with a prime suffix.

In the apparatus 150, digital information is recorded on the master tape M. Hence, the requirement for the analog to digital converter 20 has been obviated. The output of the reproducing device 151 is applied to the digital framing buffer 25'. The microprocessor 60' will operate either from an analog recorded master tape or digital recorded master tape. An operator input to the microprocessor will instruct the system as to whether it is an analog recorded master mode or digital recorded master mode. In turn, the read only memory for the microprocessor will be selected for either an analog recorded master mode or a digital recorded master mode.

It is within the contemplation of the present invention that digital data can be recorded simultaneously on a plurality of slave tapes. In so doing, the digital to analog converter 50 of the apparatus 10 and the digital to analog converter 50' of the apparatus 150 will be omitted. In lieu of the recording device 55 and 55', the recording device for recording digital information on slave tapes may be a 3M Model DMS-4. More specifically a well-known digital recording device, such as record tape manufactured by 3M Corporation of St. Paul, Minn. as Model DMS-4.

The principles of the present invention are applicable for recording either audio information or video information from a master medium onto a slave medium. The method and apparatus herein described may be employed for recording either audio information or video information on a slave medium. The format for the analog information or the digital information recorded on the master medium may be either an audio format or a video format.

We claim:
1. A method of recording information on a recording medium that is reproduced from a master medium comprising the steps of:
 (a) reproducing information from a master medium at one rate;
 (b) storing the information as digital information;
 (c) retrieving the stored digital information;
 (d) converting the retrieved digital information into analog information; and
 (e) recording the analog information at a rate faster than said one rate onto a recording medium.

2. A method of recording information as claimed in claim 1 wherein the information on said master medium is analog information, said method further comprising the step of converting said reproduced information into digital information before the storing of the information as digital information.

3. A method of recording as claimed in claim 1 wherein the information on said master medium is digital information.

4. A method of recording information as claimed in claim 2 wherein the stored digital information is retrieved at a rate faster than the rate at which digital information is stored.

5. A method of recording information as claimed in claim 3 wherein the stored information is retrieved at a rate faster than the rate at which the digital information is stored.

6. Apparatus for recording information on a recording medium that is reproduced from a master medium comprising:
   (a) a digital storage device;
   (b) circuit means for reproducing information from the master medium at one rate and storing the reproduced information as digital information into said digital storage device at said one rate, said circuit means retrieving the stored digital information from said digital storage device at a rate faster than said one rate and converting the retrieved digital information into analog information; and
   (c) a recording device receiving said retrieved analog information from said circuit means for recording said retrieved analog information on a recording medium at a rate faster than said one rate.

7. Apparatus for recording information as claimed in claim 6 wherein said circuit means comprises a digital framing buffer circuit for blocking data streams from said digital information in said storage device into frames, for adding header address in each of said blocks and adding coding into each of said frames for data error detection.

8. Apparatus for recording information as claimed in claim 7 wherein said digital framing buffer circuit receives stored digital information from said digital storage device and advances a stream of digital information.

9. Apparatus for recording information as claimed in claim 8 wherein said circuit means comprises a digital to analog converter circuit for receiving the stream of digital information advanced from said digital framing buffer circuit and applying said analog information to said recording device.

10. Apparatus for recording information as claimed in claim 9 wherein said digital storage device generates timing information and wherein said circuit means includes a clock generator for receiving timing information from said digital storage device to maintain the speed aligment of said digital framing buffer circuit, said digital to analog converter circuit and said recording device in synchronism with the information retrieved from said digital storage device.

11. Apparatus for recording information as claimed in claim 6 wherein the information on said master medium is analog information and wherein said circuit means comprises a reproducing device for reproducing the analog information from said master medium.

12. Apparatus for recording information as claimed in claim 11 wherein said circuit means comprises an analog to digital converter for receiving analog information from said reproducing device and applying digital information to said digital framing buffer circuit.

13. Apparatus for recording information as claimed in claim 12 wherein said reproducing device reproduces said master medium timing information and wherein said circuit means includes a clock generator for receiving timing information from said reproducing device for synchronizing the operation of said analog to digital converter circuit, said digital framing buffer circuit and the storing of digital information in said digital storage device with the timing information on said master medium.

14. Apparatus for recording information as claimed in claim 6 wherein the information on said master medium is digital information and wherein said circuit means comprises a reproducing device for reproducing the digital information on said master medium and applying said reproduced digital information to said digital framing buffer circuit.

15. Apparatus for recording information as claimed in claim 14 wherein said master medium has timing information thereon and wherein said reproducing device reproduces from said master medium timing information and wherein said circuit means includes a clock generator for receiving timing information from said reproducing device for synchronizing the operation of said digital framing buffer circuit and the storing of digital information in said digital storage device with the timing pulses on said master medium.

16. Apparatus for recording information as claimed in claim 13 and further comprising a programmed microprocessor for sensing the status of and for controlling the operation of said reproducing device, said analog to digital converter, said digital framing buffer, said digital sotrage device, said digital to analog converter, said recording device and said clock generator for recovering digital information from said digital storage device at a faster rate than storing digital information in said digital storing device.

17. Apparatus for recording information as claimed in claim 15 and further comprising a programmed microprocessor for sensing the status of and for controlling the operation of said reproducing device, said digital framing buffer circuit, said digital storage device, said digital to analog converter, said recording device and said clock generator for retrieving digital information from said digital storage device at a faster rate than storing digital information in said digital storing device.

18. Apparatus for recording information on a recording medium that is reproduced from a master medium comprising:
   (a) a digital storage device;
   (b) circuit means for reproducing information from the master medium at one rate and storing the reproduced information as digital information into said digital storage device, said circuit means retrieving the stored digital information from said digital storage device at a rate faster than said one rate; and
   (c) a recording device receiving said retrieved digital information from said circuit means for recording said retrieved digital information on a recording medium at a rate faster than said one rate.

19. Apparatus for recording information as claimed in claim 1 wherein the information on said master medium is analog information, said circuit means comprising an analog to digital converter for converting said reproduced analog information into digital information for storing in said digital storage device.

20. Apparatus as claimed in claim 1 wherein the information on said master medium is digital information.

21. Apparatus for recording information as claimed in claim 1 wherein said circuit means comprises a digital framing buffer circuit for blocking data streams from the digital information converted by said analog to digital converter into frames before storing the digital information into said storage device, for adding header address in each of said blocks and adding coding into each of said frames for data error detection.

22. Apparatus for recording information as claimed in claim 1 wherein said digital framing buffer circuit receives stored digital information from said digital storage device and advances a stream of digital information to said recording device.

23. Apparatus for recording information as claimed in claim 1 wherein said circuit means comprises a digital framing buffer circuit for blocking data streams from the digital information from said digital information into frames before storing the digital information into said storage device, for adding header address in each of said blocks and adding coding into each of said frames for data error detection.

24. Apparatus for recording information as claimed in claim 1 wherein said digital framing buffer circuit receives stored digital information from said digital storage device and advances a stream of digital information to said recording device.

25. Apparatus for recording information as claimed in claim 6 wherein said digital storage device comprises a plurality of data storage modules for storing successively digital information reproduced by said circuit means.

26. Apparatus for recording information as claimed in claim 1 wherein said circuit means comprises a digital framing buffer circuit for blocking data streams from said digital information into frames before storing the digital information into said storage device, said digital framing buffer circuit comprising a plurality of storage devices for storing successively digital information for discharge into said modules successively and for retrieving digital information successively from said modules, said storage devices of said digital framing buffer circuit advancing a stream of digital information for conversion into analog information.

27. Apparatus as claimed in claim 1 and further comprising a programmed microprocessor for controlling the sequential operations between said modules of said storage device and between said storage devices of said digital framing buffer circuit and between said modules of said storage device and said storage devices of said digital framing buffer circuit.

28. Apparatus for recording information as claimed in claim 1 wherein the information on said master medium is analog information and wherein said circuit means comprises a reproducing device for reproducing the analog information from said master medium and said circuit means further comprises an analog to digital converter for receiving analog information from said reproducing device and applying digital information to said digital framing buffer circuit.

29. Apparatus for recording information as claimed in claim 1 wherein the information on said master medium is digital information and wherein said circuit means comprises a reproducing device for reproducing the digital information on said master medium and applying said reproduced digital information to said digital framing buffer circuit.

30. Apparatus for recording information as claimed in claim 18 wherein said digital storage device comprises a plurality of data storage modules for storing successively digital information from said circuit means.

31. Apparatus for recording information as claimed in claim 1 wherein said circuit means comprises a digital framing buffer circuit for blocking data streams from said digital information into frames before storing the digital information into said storage device, said digital framing buffer comprising a plurality of storage devices for storing successively digital information for discharge into said modules successively and retrieving digital information successively from said modules, said storage devices of said digital framing buffer circuit advancing a stream of digital information to said recording device.

32. Apparatus for recording information as claimed in claim 1 and further comprising a programmed microprocessor for controlling the sequential operations between said modules of said storage device and between said storage devices of said digital framing buffer circuit and between said modules of said storage device and said storage devices of said digital framing buffer circuit.

33. Apparatus for recording information as claimed in claim 1 wherein the information on said master medium is analog information, said circuit means comprising an analog to digital converter for converting said reproduced analog information into digital information for storing in said storage devices of said digital framing buffer circuit.

34. Apparatus for recording information as claimed in claim 1 wherein the information on said master medium is digital information.

* * * * *

REEXAMINATION CERTIFICATE (1691st)
United States Patent [19]
Newdoll et al.

[11] B1 4,410,917
[45] Certificate Issued May 5, 1992

[54] METHOD OF AND APPARATUS FOR RECORDING INFORMATION FROM A MASTER MEDIUM ONTO A SLAVE MEDIUM EMPLOYING DIGITAL TECHNIQUES

[75] Inventors: Ronald M. Newdoll, Woodside; John E. Phillips, Cupertino, both of Calif.

[73] Assignee: Accurate Sound Corporation, Redwood City, Calif.

Reexamination Request:
No. 90/002,283, Feb. 20, 1991

Reexamination Certificate for:
Patent No.: 4,410,917
Issued: Oct. 18, 1983
Appl. No.: 302,159
Filed: Sep. 14, 1981

[51] Int. Cl.⁵ .................................. G11B 5/86
[52] U.S. Cl. .............................. 360/15; 360/32; 369/84
[58] Field of Search ............ 360/8, 10.1, 15, 32; 358/310, 312, 335, 339; 369/59, 60, 84, 85

[56] References Cited

U.S. PATENT DOCUMENTS

| | | | |
|---|---|---|---|
| 4,141,039 | 2/1979 | Yamamoto | 358/339 |
| 4,229,770 | 10/1980 | Ito | 360/15 |
| 4,254,500 | 3/1981 | Brookhart | 371/38 |
| 4,355,338 | 10/1982 | Yamamoto et al. | |
| 4,375,655 | 3/1983 | Korth et al. | 360/15 |

FOREIGN PATENT DOCUMENTS

2059713 7/1980 United Kingdom.

OTHER PUBLICATIONS

1977 Advertising Brochure by Alpha Data, Inc. for the CCDISC Memory System.
Artwick, *Microcomputer Interfacing*, pp. 128-130 and 142-143, 1980, Prentice Hall, Englewood Cliffs, NJ.
Oppenheim, Applications of Digital Signal Processing, Prentice Hall, 1978, pp. 29, 53-56 and 110-111.
Bennett and Davey, Data Transmission, McGraw Hill, 1965 p. 260.

*Primary Examiner*—Robert L. Richardson

[57] ABSTRACT

A method of and apparatus for recording information from a master medium onto a slave medium. Analog information on a master medium is reproduced and converted into digital information. The digital information is stored in a digital storage device. The digital information stored in the digital storage device is recovered from the digital storage device and converted from digital information into analog information. The analog information is applied to a recording device for recording the analog information onto a slave medium. Information is recorded in the digital storage device at the same rate as it is recorded on the master medium. Information is recovered from the digital storage device at a faster rate than it is recorded on the master medium and the information is recorded on a slave medium by the recording device at a faster rate than it is recorded on the master medium. Thus, less time is required for recording information on a slave medium than is required for recording information on the master medium to reduce the duplication time.

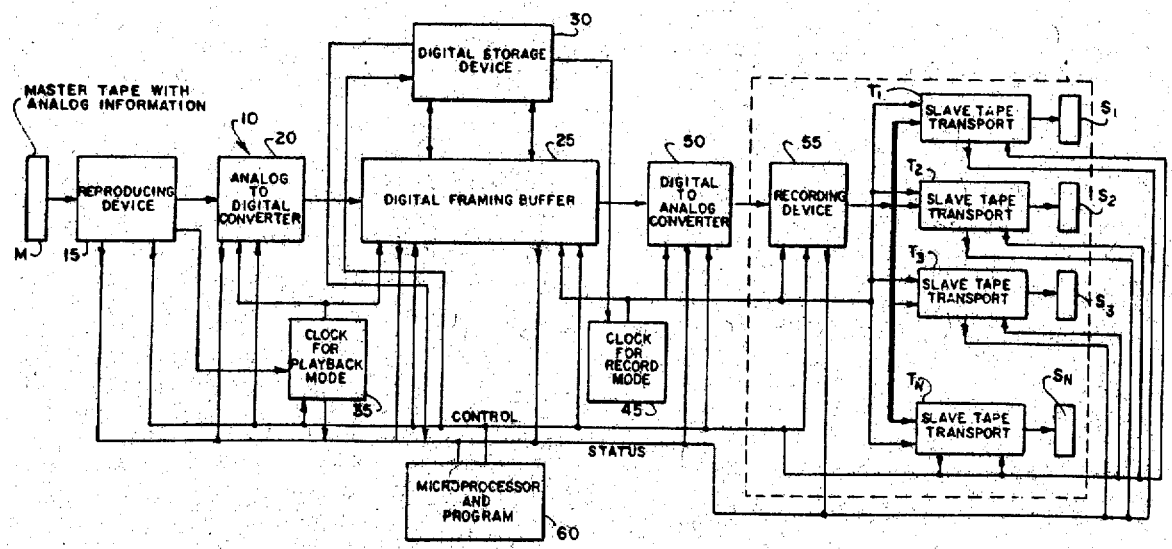

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 19-21 and 25-34 are cancelled.

Claims 1, 6-8, 10, 13-18 and 22-24 are determined to be patentable as amended.

Claims 2-5, 9, 11 and 12, dependent on an amended claim, are determined to be patentable.

New claims 35-62 are added and determined to be patentable.

1. A method of recording *audio* information on a recording medium that is reproduced from a master medium comprising the steps of:
   (a) reproducing information from a master medium at one rate;
   (b) *blocking information reproduced from the master medium into frames;*
   (c) *adding error detection coding to said frames;*
   [(b)] (d) storing the *frames of reproduced* information as digital information *in a solid state memory device;*
   [(c)] (e) *repeatedly* retrieving the stored digital information *from said solid state memory device;*
   [(d)] (f) converting the retrieved digital information into analog information; and
   [(e)] (g) recording the analog information at a rate faster than said one rate onto a recording medium.

6. Apparatus for recording information on a recording medium that is reproduced from a master medium comprising:
   (a) a digital storage device;
   (b) circuit means *including a digital framing buffer circuit* for reproducing information from the master medium at one rate, *blocking streams of said information into frames, adding coding to each of said frames of information for data error correction,* and storing the reproduced information as digital information in said digital storage device at said one rate, said circuit means retrieving the stored digital information from said digital storage device at a rate faster than said one rate and converting the retrieved digital information into analog information; and
   (c) a recording device receiving said [retrieved] analog information from said circuit means for recording said [retrieved] analog information on a recording medium at a rate faster than said one rate.

7. Apparatus for recording information [as claimed in claim 6 wherein said circuit means comprises] *on a recording medium that is reproduced from a master medium comprising:*
   (a) *a digital storage device;*
   (b) *circuit means for reproducing information from the master medium at one rate and storing the reproduced information as digital information in said digital storage device at said one rate, said circuit means retrieving the stored digital information from said digital storage device at a rate faster than said one rate and converting the retrieved digital information into analog information, and including* a digital framing buffer circuit for blocking data streams from said digital information in said storage device into frames *or blocks,* for adding header address in each of said *frames or* blocks and adding coding into each of said frames *or blocks* for data error detection; *and*
   (c) *a recording device receiving said analog information from said circuit means for recording said analog information on a recording medium at a rate faster than said one rate.*

8. Apparatus for recording information as claimed in claim 7, wherein said digital framing buffer circuit receives *frames or blocks of* stored digital information from said digital storage device and [advances] *converts said frames or blocks of data into* a stream of digital information.

10. Apparatus for recording information as claimed in claim 9 [wherein said digital storage device generates timing information and] wherein said circuit means includes a clock generator for [receiving] *generating* timing information [from said digital storage device] to maintain [the speed alignment of] said digital framing buffer circuit, said digital to analog converter circuit and said recording device in synchronism with the information retrieved from said digital storage device.

13. Apparatus for recording information as claimed in claim 12 wherein said reproducing device reproduces [said master medium] timing information *from said master medium* and *said circuit means receives the reproduced timing information, and* wherein said circuit means includes a clock generator for [receiving] *generating clock pulses in accordance with the* timing information from said reproducing device for synchronizing the operation of said analog to digital converter circuit, said digital framing buffer circuit and the storing of digital information in said digital storage device with the timing information on said master medium.

14. Apparatus for recording information as claimed in claim 6 wherein the information on said master medium is digital information and wherein said circuit means [comprises] *includes* a reproducing device for reproducing the digital information on said master medium and applying said reproduced digital information to said digital framing buffer circuit.

15. Apparatus for recording information as claimed in claim 14 wherein said master medium has timing information thereon and [wherein] said reproducing device reproduces [from said master medium] timing information *from said master medium* and *said circuit means receives the reproduced timing information, and* wherein said circuit means includes a clock generator for [receiving] *generating clock pulses in accordance with the* timing information from said reproducing device for synchronizing the operation of said digital framing buffer circuit and the storing of digital information in said digital storage device with the timing [pulses] *information* on said master medium.

16. Apparatus for recording information as claimed in claim 13 and further comprising a programmed microprocessor for sensing the status of and for controlling the operation of said reproducing device, said analog to digital converter, said digital framing buffer *circuit,* said digital storage device, [said digital to analog converter,] said recording device and said clock generator for recovering digital information from said digital storage device at a faster rate than storing digital information in said digital [storing] *storage* device.

17. Apparatus for recording information as claimed in claim 15 and further comprising a programmed microprocessor for sensing the status of and for controlling the operation of said reproducing device, said digital framing buffer circuit, said digital storage device, [said digital to analog converter,] said recording device and said clock generator for retrieving digital information from said digital storage device at a faster rate than storing digital information in said digital [storing] *storage* device.

18. Apparatus for recording information on a recording medium *that is reproduced from a master medium containing analog information,* comprising:
   (a) a [digital] *solid state* storage device;
   (b) circuit means for reproducing information from the master medium at one rate and storing the reproduced information as digital information into said [digital] *solid state* storage device, said circuit means *repeatedly* retrieving the stored digital information from said digital] *solid state* storage device at a rate faster than said one rate[; and], *said circuit means including:*
   an analog to digital converter for converting said reproduced information into digital information for storing in said solid state storage device, and
   a digital framing buffer circuit for blocking streams of digital information from said analog to digital converter into frames before storing the digital information into said storage device; and
   (c) a recording device receiving said retrieved digital information from said circuit means for recording said retrieved digital information on a recording medium at a rate faster than said one rate.

22. Apparatus for recording information as claimed in claim [1] 18 wherein said digital framing buffer circuit receives *frames of* stored digital information from said [digital] *storage* device and [advances] *converts said frames of information into* a stream of digital information *that is advanced* to said recording device.

23. Apparatus for recording information [as claimed 50 in claim 1 wherein said circuit means comprises] *on a recording medium that is reproduced from a master medium containing digital information,* comprising:
   (a) *a solid state storage device;*
   (b) *circuit means for reproducing information from the master medium at one rate and storing the reproduced information as digital information into said solid state storage device, said circuit means repeatedly retrieving the stored digital information from said solid state storage device at a rate faster than said one rate, said circuit means including* a digital framing buffer circuit for blocking [data] *streams* [from the digital information from] *of* said digital information into frames before storing the digital information into said storage device [for adding header address in each of said blocks and adding coding into each of said frames for data error detection], *and;*
   (c) *a recording device receiving said retrieved digital information from said circuit means for recording said retrieved digital information on a recording medium at a rate faster than said one rate.*

24. Apparatus for recording information as claimed in claim [1] *23* wherein said digital framing buffer circuit receives stored *frames of* digital information from said digital storage device and [advances] *converts said frames to* a stream of digital information *that is advanced* to said recording device.

*35. A method of recording information as claimed in claim 1, further comprising the step of generating clock pulses and controlling the rate at which information is read from the solid state storage means in response to said clock pulses.*

*36. The method of claim 35 wherein said audio information comprises stereophonic information, and further including the step of controlling the recording of each channel of stereophonic information by means of said clock pulses to thereby minimize phase shifts between channels of the stereophonic information.*

*37. A method of recording information as claimed in claim 1, further comprising the steps of collecting and recording statistics on error conditions while information is being reproduced from the master medium for storage into the solid state memory device.*

*38. The method of claim 1 wherein the stored digital information is retrieved from said solid state memory device at a rate faster than said one rate.*

*39. The apparatus of claim 6 wherein said digital storage device comprises a solid state memory.*

*40. The apparatus of claim 39 wherein said circuit means repeatedly retrieves the stored digital information from said solid state memory.*

*41. The apparatus of claim 39 further including a clock generator to generate clock pulses for controlling the rate at which information is read from said solid state storage memory.*

*42. The apparatus of claim 41 wherein the information from the master medium comprises stereophonic audio information, and wherein said circuit means controls the recording of each channel of stereophonic information in accordance with said clock pulses to thereby minimize phase shifts between channels of the stereophonic information.*

*43. Apparatus for recording information as claimed in claim 6, wherein said digital framing buffer circuit receives frames of data from said digital storage device and converts them into a stream of digital data.*

*44. The apparatus of claim 18 wherein said digital framing buffer circuit includes means for adding header addresses to said frames before they are stored in said storage device.*

*45. The apparatus of claim 18 wherein said digital framing buffer circuit includes means for adding error detection coding to each of said frames before they are stored in said storage device.*

*46. The apparatus of claim 18 further including a clock generator to generate clock pulses for controlling the rate at which information is read from said solid state storage device.*

*47. The apparatus of claim 46 wherein the information from the master medium comprises stereophonic audio information, and wherein said circuit means controls the recording of each channel of stereophonic information in accordance with said clock pulses to thereby minimize phase shifts between channels of the stereophonic information.*

48. Apparatus for recording information as claimed in claim 23 wherein said digital framing buffer circuit includes means for adding error coding to the frames prior to storage in said storage device.

49. Apparatus for recording information as claimed in claim 23 wherein said digital framing buffer circuit includes means for adding header addresses to said frames before storage in said storage device.

50. A method of recording audio information on a recording medium that is reproduced from a master medium comprising the steps of:
 (a) reproducing information from a master medium at one rate;
 (b) reproducing timing pulses from the master medium;
 (c) generating clock pulses in response to said timing pulses;
 (d) storing the reproduced information as digital information in a solid state memory device under the control of said clock pulses to thereby synchronize the storage of digital information with the rate at which information is reproduced from the master medium;
 (e) repeatedly retrieving the stored digital information from said solid state memory device;
 (f) converting the retrieved digital information into analog information; and
 (g) recording the analog information at a rate faster than said one rate onto a recording medium.

51. Apparatus for recording information on a recording medium that is reproduced from a master medium comprising:
 (a) a digital storage device;
 (b) circuit means including a digital framing buffer circuit for reproducing information from the master medium at one rate, blocking streams of said information into frames, adding header addresses to said frames of data, and storing the reproduced information as digital information in said digital storage device at said one rate, said circuit means retrieving the stored digital information from said digital storage device at a rate faster than said one rate and converting the retrieved digital information into analog information; and
 (c) a recording device receiving said analog information from said circuit means for recording said analog information on a recording medium at a rate faster than said one rate.

52. Apparatus for recording information on a recording medium that is reproduced from a master medium containing analog information, comprising:
 (a) a digital storage device;
 (b) circuit means including means for reproducing information from the master medium at one rate, an analog to digital converter for converting the reproduced analog information into streams of digital information, a digital framing buffer circuit for blocking streams of data from said digital to analog converter into frames of digital information, adding header addresses to said frames and adding error detection coding to said frames, means for storing the frames of digital information in said digital storage device, and means for retrieving the stored digital information from said digital storage device at a rate faster than said one rate; and
 (c) a recording device receiving said retrieved digital information from said circuit means for recording said retrieved digital information on a recording medium at a rate faster than said one rate.

53. Apparatus for recording information on a recording medium that is reproduced from a master medium containing digital information, comprising:
 (a) a digital storage device;
 (b) circuit means including means for reproducing information from the master medium at one rate, a digital framing buffer circuit for blocking streams of data from said reproducing means into frames of digital information, adding header addresses to said frames and adding error detection coding to said frames, means for storing the frames of digital information in said digital storage device, and means for retrieving the stored digital information from said digital storage device at a rate faster than said one rate; and
 (c) a recording device receiving said retrieved digital information from said circuit means for recording said retrieved digital information on a recording medium at a rate faster than said one rate.

54. Apparatus for recording information on a recording medium that is represented from a master medium comprising:
 (a) a solid state storage device;
 (b) circuit means for reproducing information from the master medium at one rate and storing the reproduced information as digital information in said solid state storage device at said one rate, said circuit means retrieving the stored digital information from said storage device at a rate faster than said one rate and converting the retrieved digital information into analog information, said circuit means including a digital framing buffer circuit for blocking streams of said digital information into frames or blocks for storage in said solid state storage device and for adding coding to each of said frames or blocks of data for data error detection; and
 (c) a recording device receiving said analog information from said circuit means for recording said analog information on a recording medium at a rate faster than said one rate.

55. The apparatus of claim 54 wherein said circuit means repeatedly retrieves the stored digital information from said solid state memory.

56. Apparatus for recording information as claimed in claim 54, wherein said digital framing buffer circuit receives frames or blocks of data from said storage device and converts them into a stream of digital data.

57. Apparatus for recording information as claimed in claim 56, wherein said circuit means includes a digital to analog converter for converting said stream of digital data into an analog signal that is applied to said recording device, and a clock generator for generating timing information to maintain said digital framing buffer circuit, said digital to analog converter and said recording device in synchronism with the information retrieved from said solid state storage device.

58. Apparatus for recording information as claimed in claim 54, wherein said master medium has timing information thereon and said circuit means receives timing information reproduced from said master medium, and wherein said circuit means includes a clock generator for generating clock pulses in accordance with the timing information from said master medium to synchronize the operation of said digital framing buffer circuit and the storing of digital information in said solid state storage device with the timing information on said master medium.

59. Apparatus for recording information as claimed in claim 58 and further comprising a programmed microprocessor for sensing the status of and for controlling the operation of said digital framing buffer circuit, said digital storage device, said recording device and said clock generator for retrieving digital information from said storage device at a faster rate than storing digital information in said storage device.

60. The apparatus of claim 54 further including a clock generator to generate clock pulses for controlling the rate at which information is read from said solid state storage device.

61. The apparatus of claim 60 wherein the information from the master medium comprises stereophonic audio information, and wherein said circuit means controls the recording of each channel of stereophonic information in accordance with said clock pulses to thereby minimize phase shifts between channels of the stereophonic information.

62. Apparatus for recording information on a recording medium that is reproduced from a master medium comprising:
(a) a solid state storage device;
(b) circuit means for reproducing information from the master medium at one rate and storing the reproduced information as digital information in said solid state storage device at said one rate, said circuit means retrieving the stored digital information from said storage device at a rate faster than said one rate and converting the retrieved digital information into analog information, said circuit means including a digital framing buffer circuit for blocking streams of said digital information into frames or blocks for storage in said solid state storage device and for adding header addresses to said frames or blocks of data; and
(c) a recording device receiving said analog information from said circuit means for recording said analog information on a recording medium at a rate faster than said one rate.

* * * * *